US012203248B1

United States Patent
Yeadon

(10) Patent No.: US 12,203,248 B1
(45) Date of Patent: Jan. 21, 2025

(54) RAPID HYGROSCOPIC ATMOSPHERIC WATER GENERATOR

(71) Applicant: SPARK IP LLC, New York, NY (US)

(72) Inventor: Peter Yeadon, New York, NY (US)

(*) Notice: Subject to any disclaimer, the term of this patent is extended or adjusted under 35 U.S.C. 154(b) by 0 days.

(21) Appl. No.: 18/765,540

(22) Filed: Jul. 23, 2024

Related U.S. Application Data

(60) Provisional application No. 63/548,586, filed on Feb. 1, 2024.

(51) Int. Cl.
*B01D 53/04* (2006.01)
*B01D 53/26* (2006.01)
*B01J 20/24* (2006.01)
*B01J 20/34* (2006.01)
*E03B 3/28* (2006.01)

(52) U.S. Cl.
CPC ............ *E03B 3/28* (2013.01); *B01D 53/0438* (2013.01); *B01D 53/0446* (2013.01); *B01D 53/261* (2013.01); *B01D 53/265* (2013.01); *B01J 20/24* (2013.01); *B01J 20/3483* (2013.01); *B01D 2253/202* (2013.01); *B01D 2257/80* (2013.01); *B01D 2258/06* (2013.01); *B01D 2259/40098* (2013.01)

(58) Field of Classification Search
CPC ......... E03B 3/28; B01J 20/24; B01J 20/3483; B01D 53/0438; B01D 53/0446; B01D 53/261; B01D 53/265; B01D 2253/202; B01D 2257/80; B01D 2258/06; B01D 2259/40098

USPC ......... 96/121, 126, 127, 130, 134, 142, 143, 96/146, 147; 95/117, 121, 126
See application file for complete search history.

(56) References Cited

U.S. PATENT DOCUMENTS

| | | | | |
|---|---|---|---|---|
| 5,534,186 A | * | 7/1996 | Walker | ..................... C08J 3/075 96/120 |
| 6,336,957 B1 | * | 1/2002 | Tsymerman | .............. E03B 3/28 95/95 |
| 8,453,474 B2 | * | 6/2013 | Eisenhour | .............. B60H 3/024 95/122 |
| 9,737,844 B2 | * | 8/2017 | Dahlback | ........... B01D 53/0438 |
| 10,539,334 B2 | * | 1/2020 | Sakikawa | ................ B01J 20/24 |
| 10,960,347 B1 | | 3/2021 | Wang | |
| 11,326,327 B2 | | 5/2022 | Yu | |

(Continued)

*Primary Examiner* — Frank M Lawrence, Jr.
(74) *Attorney, Agent, or Firm* — Joseph D. Hodler

(57) ABSTRACT

An atmospheric water generator apparatus extracts water vapor from low humidity air using hygroscopic materials that alternate between hydrophilic and hydrophobic states based on temperature. A composite material of hygroscopic and thermoresponsive polymers facilitates water vapor absorption and desorption. The composite material is structured to maximize surface area. The apparatus includes a chamber with a thermal management system for absorption and desorption phases. The chamber can open, permitting air intake and exhaust during the absorption phase. The chamber can close, preventing external air flow during the desorption phase. Fans may assist air flow during both phases. The composite material is heated during the desorption phase. When heated, the composite material releases water vapor, which is then condensed and collected. Condensation may be aided by hydrophilic materials, hydrophobic materials, and a cooled surface.

7 Claims, 31 Drawing Sheets

(56) References Cited

U.S. PATENT DOCUMENTS

| | | | |
|---|---|---|---|
| 2006/0278089 A1* | 12/2006 | Theilow | B01D 53/263 |
| | | | 96/290 |
| 2007/0151262 A1* | 7/2007 | Bailey | B01D 5/0081 |
| | | | 62/93 |
| 2008/0093059 A1* | 4/2008 | Nishida | B01J 20/267 |
| | | | 29/890.035 |
| 2015/0020687 A1 | 1/2015 | Alkhazraji | |
| 2018/0071676 A1* | 3/2018 | Sakikawa | B01J 20/267 |
| 2020/0009497 A1* | 1/2020 | Matuska | B01D 53/261 |
| 2020/0078701 A1* | 3/2020 | Mehmi | B01D 53/1475 |
| 2020/0171461 A1* | 6/2020 | Sakikawa | B01J 20/26 |
| 2020/0363078 A1* | 11/2020 | Mulet | B01D 53/047 |
| 2023/0366348 A1* | 11/2023 | Alahyari | F02C 3/22 |

* cited by examiner

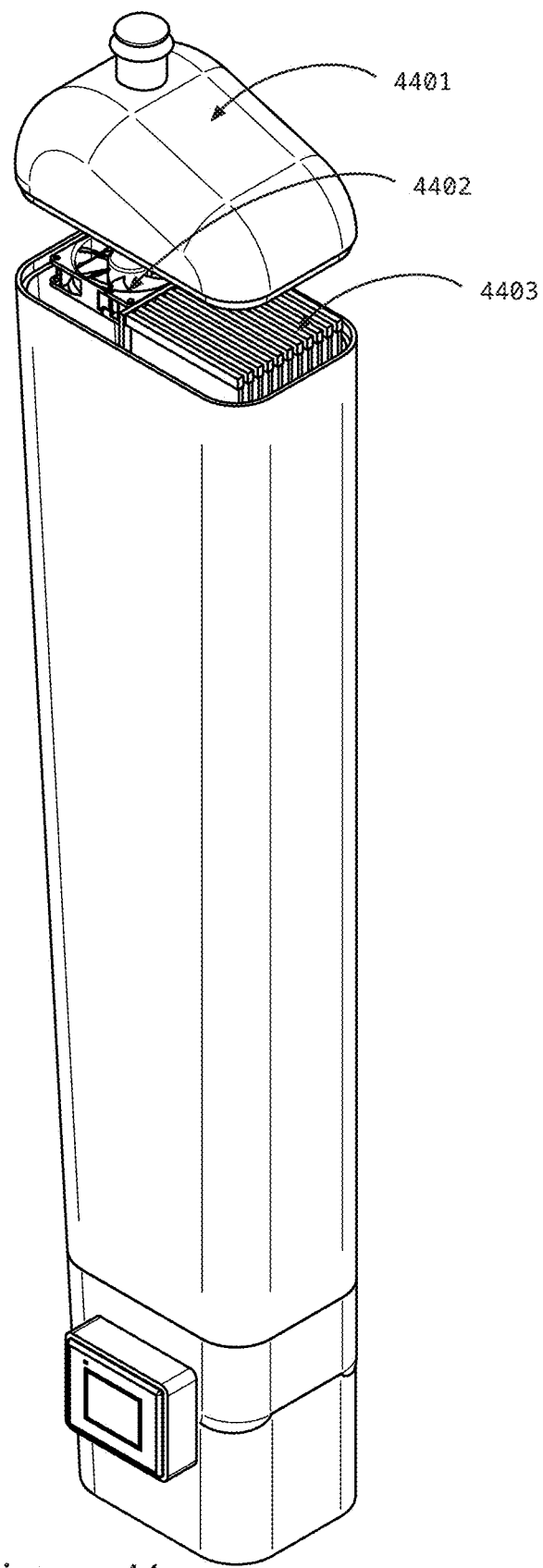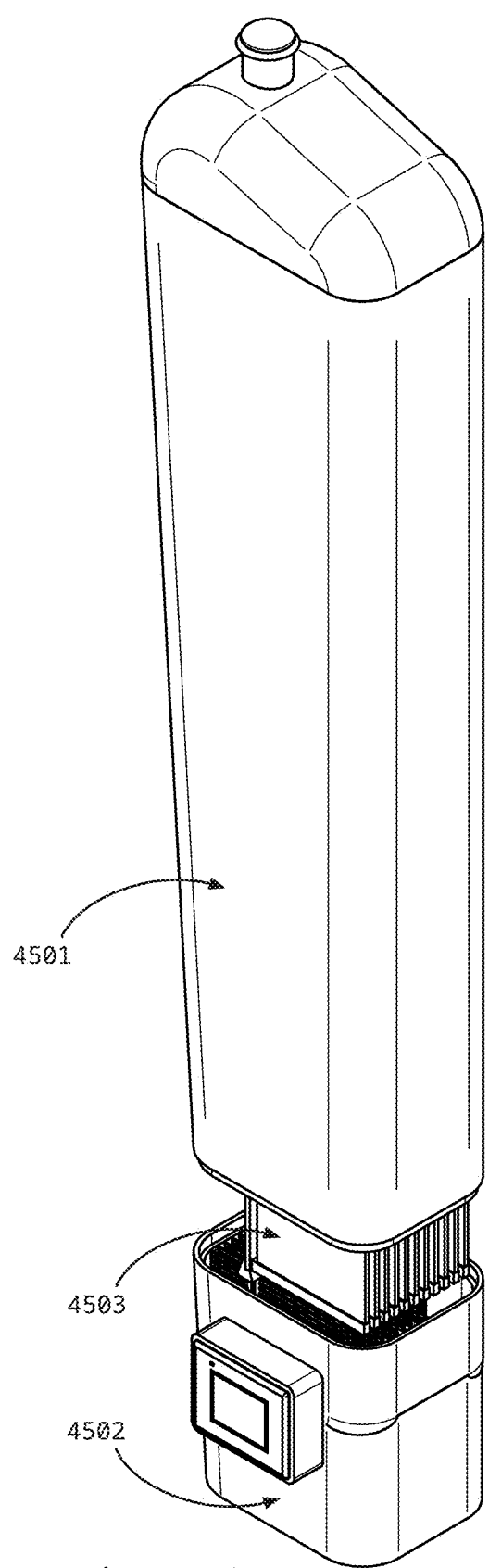
Figure 44                                          Figure 45

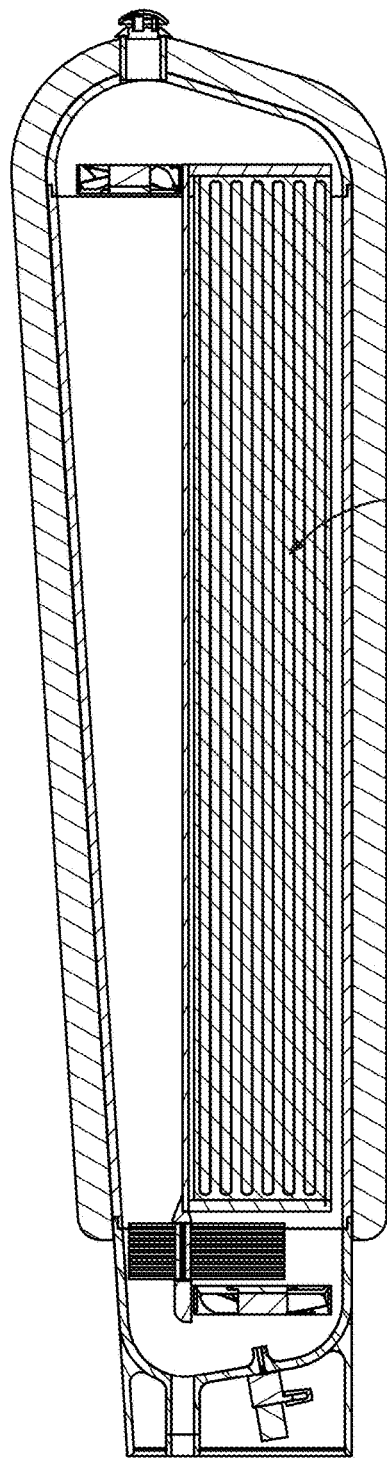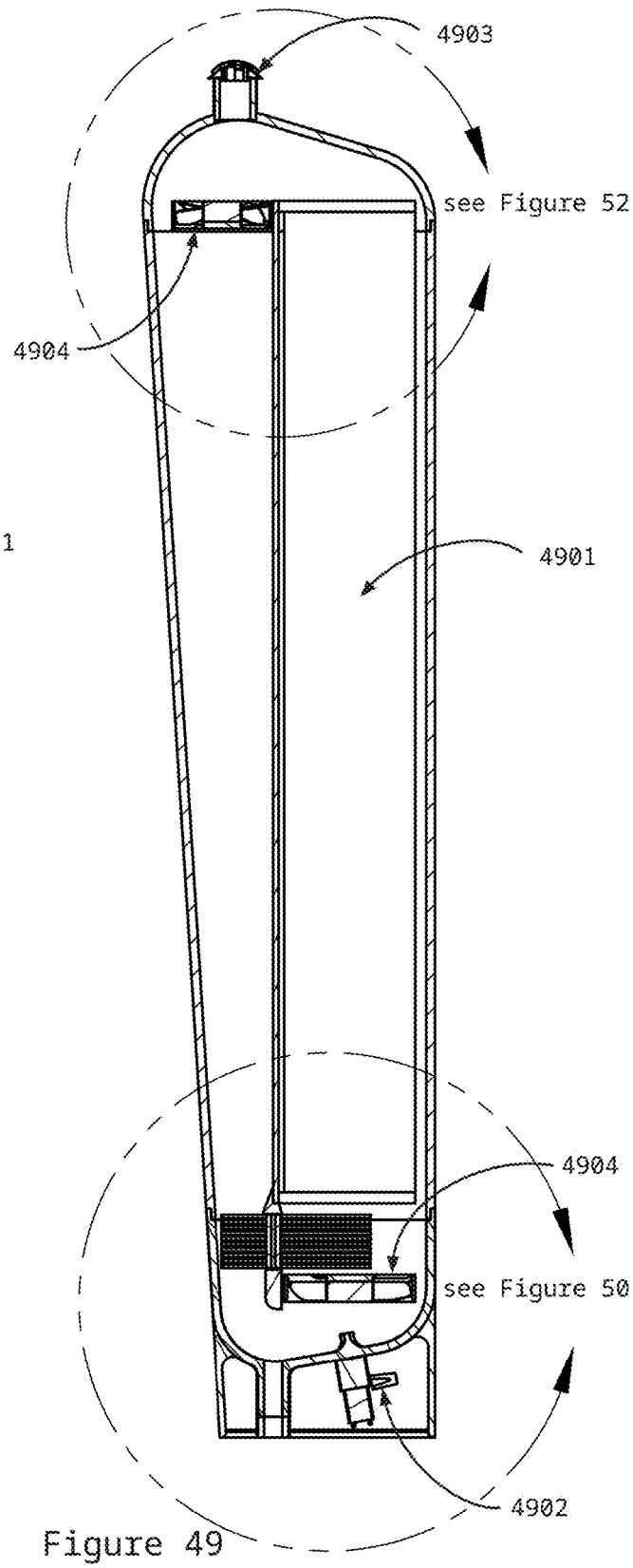
Figure 48
Figure 49

RAPID HYGROSCOPIC ATMOSPHERIC WATER GENERATOR

CROSS-REFERENCE TO RELATED APPLICATIONS

The present application is a non-provisional application, which claims the benefit of provisional patent application No. 63/548,586, filed on Feb. 1, 2024.

FIELD

The present disclosure generally relates to atmospheric water generation, and more specifically to an apparatus and process utilizing temperature-responsive hygroscopic materials for absorbing and desorbing atmospheric water.

BACKGROUND

People rely on fresh water for agriculture, industry, and consumption. Many communities around the world lack access to fresh water. Population growth and climate change are increasing the problem.

Global warming is causing more water to evaporate and remain in the atmosphere as water vapor. This increased evaporation diminishes some freshwater resources. The increase in atmospheric water vapor also shifts weather patterns, causing increased rainfall in some areas and droughts in others.

Furthermore, some communities were built in locations without a sustainable freshwater source and are experiencing diminished supply. Water scarcity can also arise during disasters, when infrastructure is damaged, and when water systems become polluted.

There are several current approaches to provide water to areas with no freshwater access. One approach collects water from the sea. Desalination is the conversion of saltwater to freshwater. It requires access to the saltwater and a large amount of energy.

Other approaches convert non-potable water to freshwater through evaporation. A solar still uses sunlight to heat and evaporate polluted water or salt water. The vapor is then condensed into purified liquid water. Solar stills require access to non-potable water and ample sunlight.

Other approaches collect water from the air. Fog catchers and dew harvesters capture water vapor from the atmosphere with hydrophilic materials. These are location-dependent and need specific high-humidity climate conditions.

An atmospheric water generator ("AWG") also collects water from the air. It uses condensation or desiccants to capture and collect water vapor. AWGs work well in moderate-to-high humidity, but not in arid conditions.

Some AWGs use hygroscopic materials, that absorb water vapor under certain humidity conditions. Common hygroscopic materials used in AWGs include polymers and salts, which may have temperature-dependent variability in degree of hydrophilicity or hydrophobicity. For example, the hygroscopic material may absorb water vapor in lower temperatures and desorb water vapor in higher temperatures.

Some devices using hygroscopic AWGs are intended for use in arid environments and utilize solar radiation as a heat source. One example places hygroscopic material in a container. During the cool night, low humidity air enters the container through openings and is absorbed by the hygroscopic material. During the warm day, the sun heats the container and causes the hygroscopic material to turn hydrophobic. The water vapor is emitted from the material into the container for condensation and collection.

These hygroscopic AWG's require access to sunlight, and are constrained to one cycle of absorption and desorption every twenty-four hours. Direct sunlight may also have detrimental effects, like overheating.

A hygroscopic AWG independent of the solar cycle would provide a more efficient means of harvesting water vapor from the atmosphere.

SUMMARY

A hygroscopic AWG apparatus is designed to extract water vapor from the atmosphere in low humidity environments. The AWG utilizes hygroscopic materials that alternate between hydrophilic and hydrophobic states based on temperature changes. The apparatus consists of a container housing a chamber with a thermal management system, allowing for the optimization of absorption and desorption cycles.

In one embodiment, the hygroscopic material is an interpenetrating polymer network composite, consisting of a hygroscopic polymer (e.g., konjac glucomannan or sodium alginate) and a thermoresponsive polymer (e.g., hydroxypropyl cellulose). The hygroscopic polymer absorbs water vapor at a lower temperature. As the temperature rises, the thermoresponsive polymer changes from hydrophilic to hydrophobic, causing the composite to emit water vapor during desorption.

The apparatus may include salts such as calcium chloride, providing hygroscopic and antimicrobial properties. Alternative embodiments may incorporate dopants, additives, and nanomaterials to enhance performance, absorption/desorption, antimicrobial properties, thermal properties, electrical properties, or biodegradability.

The chamber housing the hygroscopic material can be of various sizes and shapes, with surfaces that may be opaque for light protection. Insulation and reflective surfaces may be included for temperature control. A removable lid allows access to interior components. The chamber includes a means for air intake, exhaust, and circulation, and water collection.

The hygroscopic material can be in the form of a hygroscopic composite sheet ("HCS"), offering a structured format for easy insertion, removal, and efficient use of both sides for absorption and desorption. In one embodiment, the HCS may be made by casting the composite around a reinforcement material. In another embodiment, the HCS is attached to the surface of a reinforcement material.

The apparatus includes a heating system for the HCS, using methods like conduction, convection, or radiation. Thermoelectric modules, heating fins, or integrated resistance heating wires are among the heating elements.

The operation involves two phases: absorption and desorption. During absorption, air enters and circulates through the chamber, and the hygroscopic material absorbs water vapor. The desorption phase follows, during which the temperature is increased, turning the hygroscopic material hydrophobic, and water vapor is expelled from the composite, and condensed for collection.

Some embodiments are further comprised of a condensation surface to aid water collection during the desorption phase. The condensation surface possesses certain characteristics that attract water vapor for condensation. Characteristics may include a surface cooler than the temperature of the chamber, hydrophilic and or hydrophobic materials, and the ability to vibrate.

Some embodiments include various fans to aid air flow. These include fans to aid air intake, exhaust, as well as circulation within the chamber during absorption and/or desorption.

Various controls, sensors, and meters are incorporated into some embodiments, including temperature sensors, weight sensors, hygrometers, and electronic components for remote operation.

The temperature-controlled chamber allows for optimized absorption/desorption cycles, increasing efficiency over devices affected by day/night cycles or weather conditions. The apparatus can perform multiple cycles throughout the day, and night, resulting in higher water generation. Optimization can be achieved by adjusting heating temperatures and monitoring individual HCS performance.

Alternative embodiments consider antimicrobial features, using materials like copper or silver. The apparatus is scalable, allowing for the customization of size and multiple units operating in unison or tandem to ensure a continuous water supply.

BRIEF DESCRIPTION OF THE DRAWINGS

Particular descriptions of the principles briefly described above are rendered by specific embodiments illustrated in the drawings. These drawings depict only exemplary embodiments of the disclosure and are not limiting of its scope. The principles and advantages herein are described and explained with additional specificity and detail by the accompanying drawings in which:

FIG. 44 shows a perspective view of a dual chamber embodiment with the lid removed.

FIG. 45 shows a perspective view of a dual chamber embodiment with the body removed.

FIG. 48 shows a side section cut of the dual chamber embodiment with an insulation cover.

FIG. 49 shows a side section cut of the dual chamber embodiment without an insulation cover.

DETAILED DESCRIPTION

Figure 1:
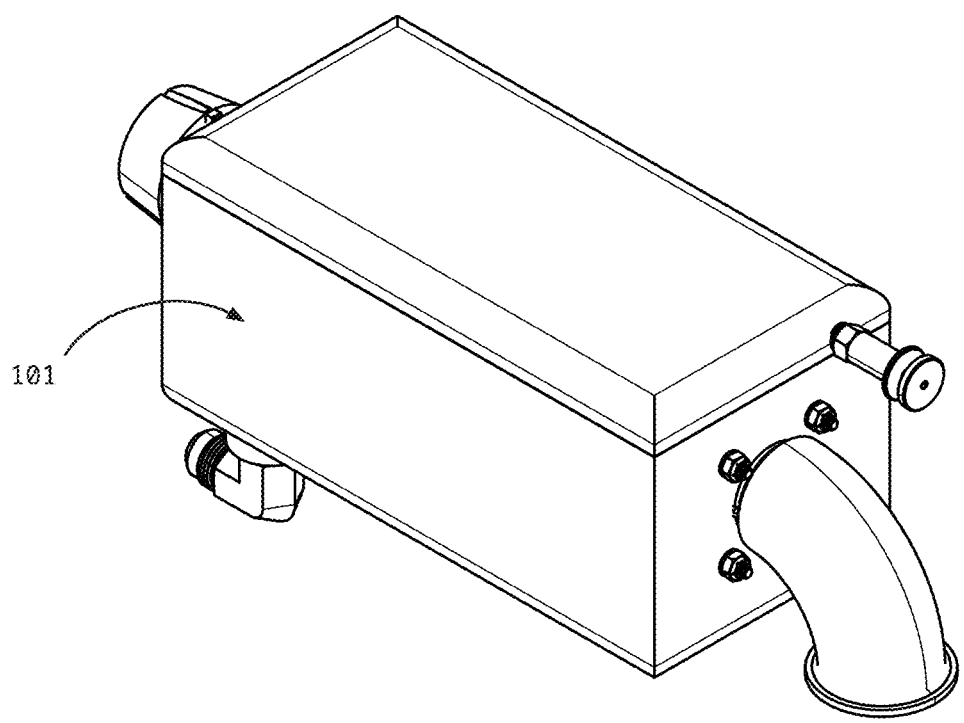
FIG. 1 is a top, front, right perspective view of one embodiment of an AWG.

A hygroscopic AWG apparatus extracts atmospheric water vapor in low humidity environments. The apparatus is comprised of a container with a closable chamber and a thermal management system, allowing the optimization of absorption and desorption cycles.

AWG & Hygroscopics

AWGs harvest water vapor from the surrounding atmosphere. The current apparatus includes a hygroscopic material for absorbing the water vapor. Furthermore, the hygroscopic material alternates between hydrophilic and hydrophobic with changes in temperature. In one embodiment, the hygroscopic material is hydrophilic at temperatures below 45-Celcius and hydrophobic above 45-Celcius. Alternative temperature ranges are envisioned.

In one embodiment, the hygroscopic material is comprised of an interpenetrating polymer network composite. The composite is comprised of at least two polymers. One polymer is hygroscopic, capable of absorbing water vapor from the air, and one is a thermoresponsive polymer that can reversibly change from hydrophilic to hydrophobic.

In one embodiment, the hygroscopic hydrogel polymer is konjac glucomannan ("KGM"). An alternative hygroscopic polymer is sodium alginate ("SA"). KGM is a natural polymer found in konjac roots, and SA is a natural polymer extracted from brown seaweed or bacteria. Any hygroscopic hydrogel polymer that can form a film, sheet, or coating is suitable.

In one embodiment, the thermoresponsive polymer is hydroxypropyl cellulose ("HPC"). HPC is derived from the cellulose of fibrous plant material, or bacterial cellulose, and is soluble in water. Alternative thermoresponsive polymers that change in their hydrophilicity/hydrophobicity include Poly(N-substituted acrylamide)s, such as poly(N-isopropylacrylamide ("PNIPAM"), and poly(N-substituted acrylamide) derivatives; ethylene glycol-based polymers, such as Poly(oligoethylene glycol methacrylate) ("POEGMA"), and POEGMA derivatives; poly(N-vinylcaprolactam) ("PNVCL"); and poly(oxazoline)s.

When the temperature is low, the hygroscopic polymer absorbs and holds atmospheric water vapor. The hygroscopic polymer becomes damp and then wet as it approaches saturation. As the temperature rises, the thermoresponsive polymer reversibly changes from hydrophilic to hydrophobic and repels water from the interpenetrating polymer network composite. The water is emitted as a higher concentration of water vapor during desorption.

Alternative embodiments may further be comprised of a salt, which is hygroscopic and antimicrobial. One embodiment used Calcium Chloride ($CaCl_2$), which is derived from natural brines found in stone formations. It is the most abundant salt found in seawater. Alternative salts include magnesium chloride, sodium chloride, lithium chloride. Others may include zinc chloride, lithium bromide, and potassium chloride.

Alternative embodiments of the hygroscopic material may also include dopants and additives to improve performance. The addition of nanomaterials may improve antimicrobial properties, thermal properties, electrical properties, porosity, or biodegradability.

In one embodiment, the interpenetrating polymer network composite is made by dissolving HPC in distilled water and adding the $CaCl_2$ salt. Its pH is balanced (to 8.5) by adding minute amounts of citric acid (e.g., from lemons or limes or other fruit). KGM is then added, and the solution is immediately cast, sprayed, or deposited on the reinforcement material, because gelation occurs very quickly.

Dopants may be added to the solution before pH balancing and before gelation occurs, although it may be possible to soak them up from a dopant brine after gelation.

After the gel sets, the composite is frozen and then dried in a freeze dryer or with an air dryer. This produces a porous composite with increased active surface area.

Chamber

Figure 2:
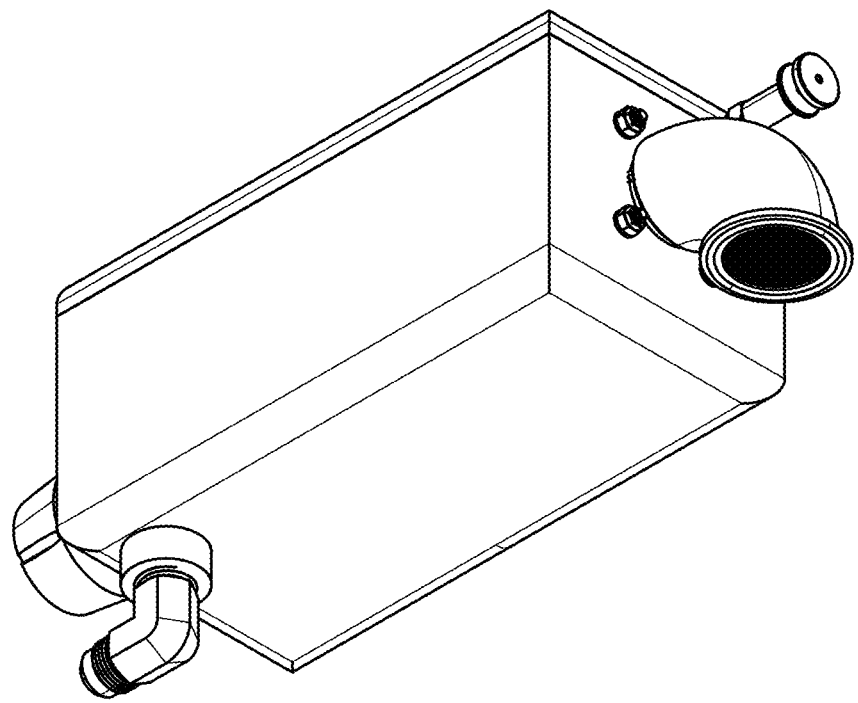
FIG. 2 is a bottom, front, right perspective view of one embodiment of an AWG.

The apparatus is comprised of a container, with the hygroscopic material inside a closable chamber. See FIGS. 1 and 2. The container 101 could be any size or shape. One embodiment utilizes a container about the size of a shoebox. The surfaces of the container may be opaque to protect against external light.

Figure 3:
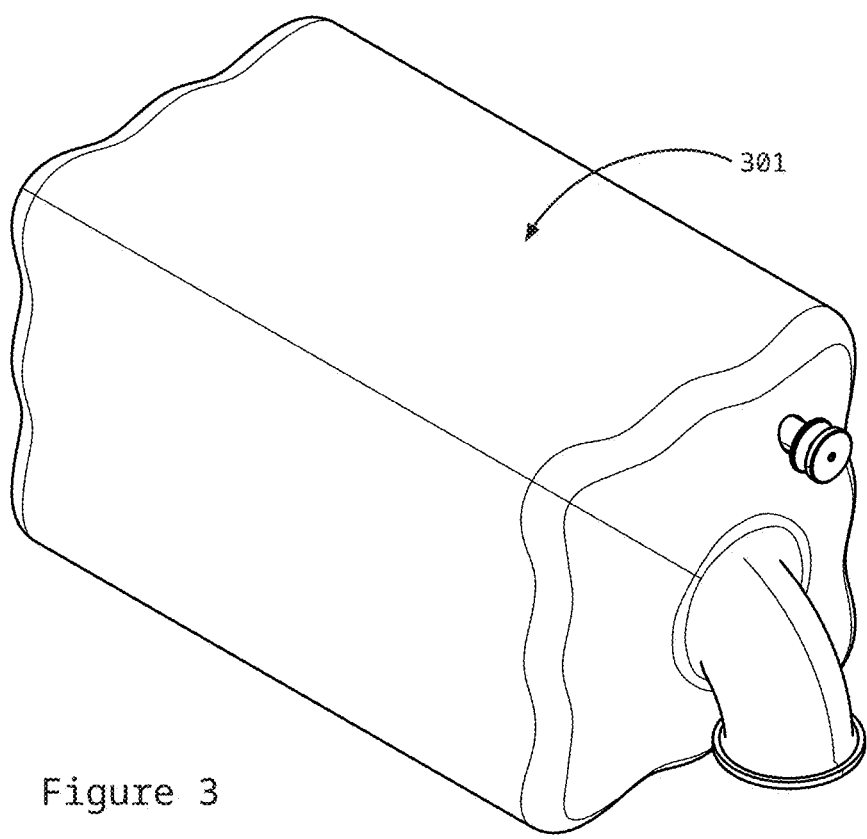
FIG. 3 is a top, front, right perspective view of one embodiment of an AWG with insulation coating.
Figure 4:
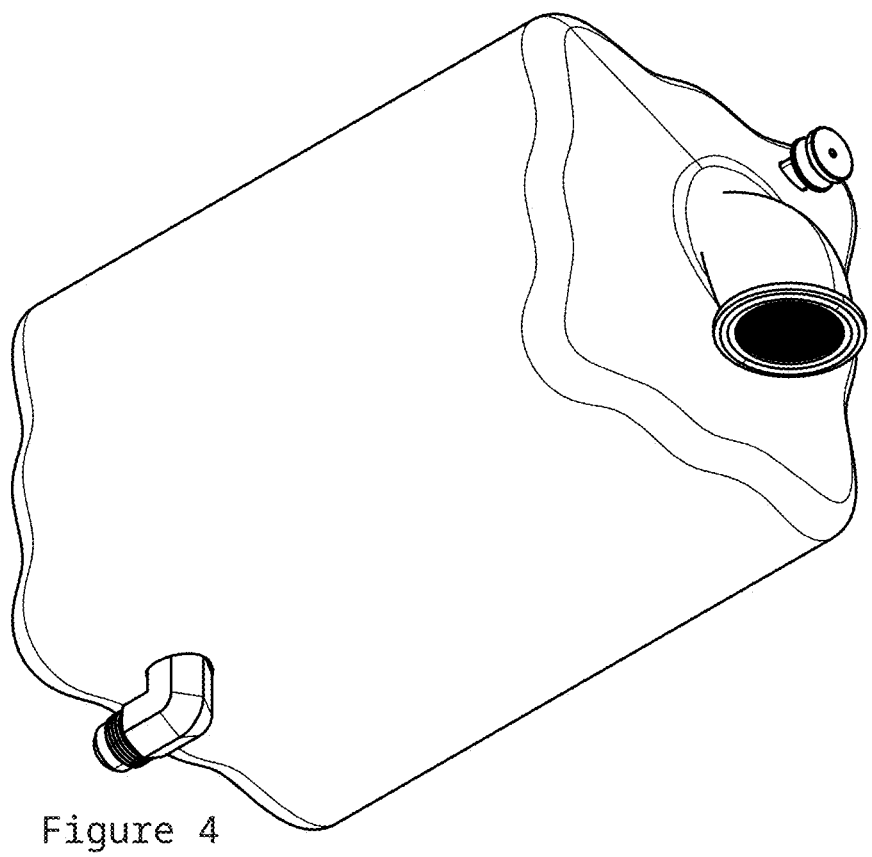
FIG. 4 is a bottom, front, right perspective view of one embodiment of an AWG with insulation coating.

Some embodiments of the apparatus may include insulation 301 surrounding the container to control the temperature inside the chamber. See FIGS. 3 and 4. Some embodiments may include a reflective surface to repel sunlight and its associated heat.

The container may be composed of various materials. The following factors may impact the choice of material: hydrophobicity and hydrophilicity, water absorption and desorption efficiency, thermal properties, electrical properties, manufacturability, cost, weight, durability, recyclability and disposability, albedo, etc.

The container and components may be composed of materials that resist microbial growth and contamination. Antimicrobial materials include copper, silver, and salt. In one embodiment, the hygroscopic material is further comprised of antimicrobial copper, silver, or carbon nanomaterials.

Figure 5:
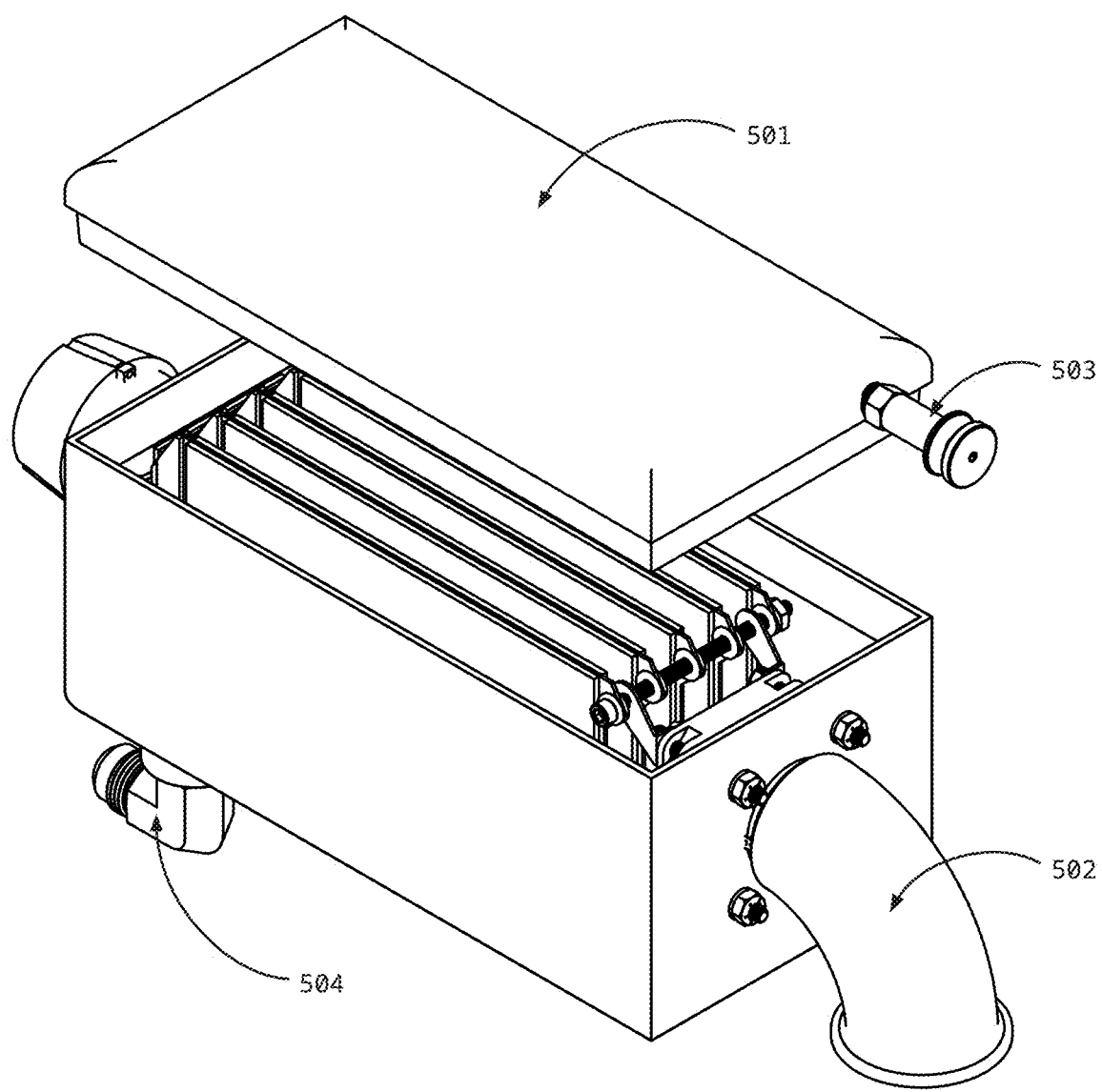
FIG. 5 is a top, front, right perspective view of one embodiment of an AWG with a removable lid.

Some embodiments of the apparatus have a removable lid 501 for accessing the interior of the chamber. See FIG. 5.

The apparatus allows air to enter and exit the chamber. Some embodiments have a separate air intake 502 and exhaust valve 503. One embodiment is further comprised of a microporous filter on the air intake and exhaust vent, to prevent microbes, spores, and other contaminants from entering the chamber. The apparatus is comprised of a means for withdrawing the water 504. One embodiment collects and drains water at the bottom of a sloped surface.

Hygroscopic Composite Sheet

Figure 6:
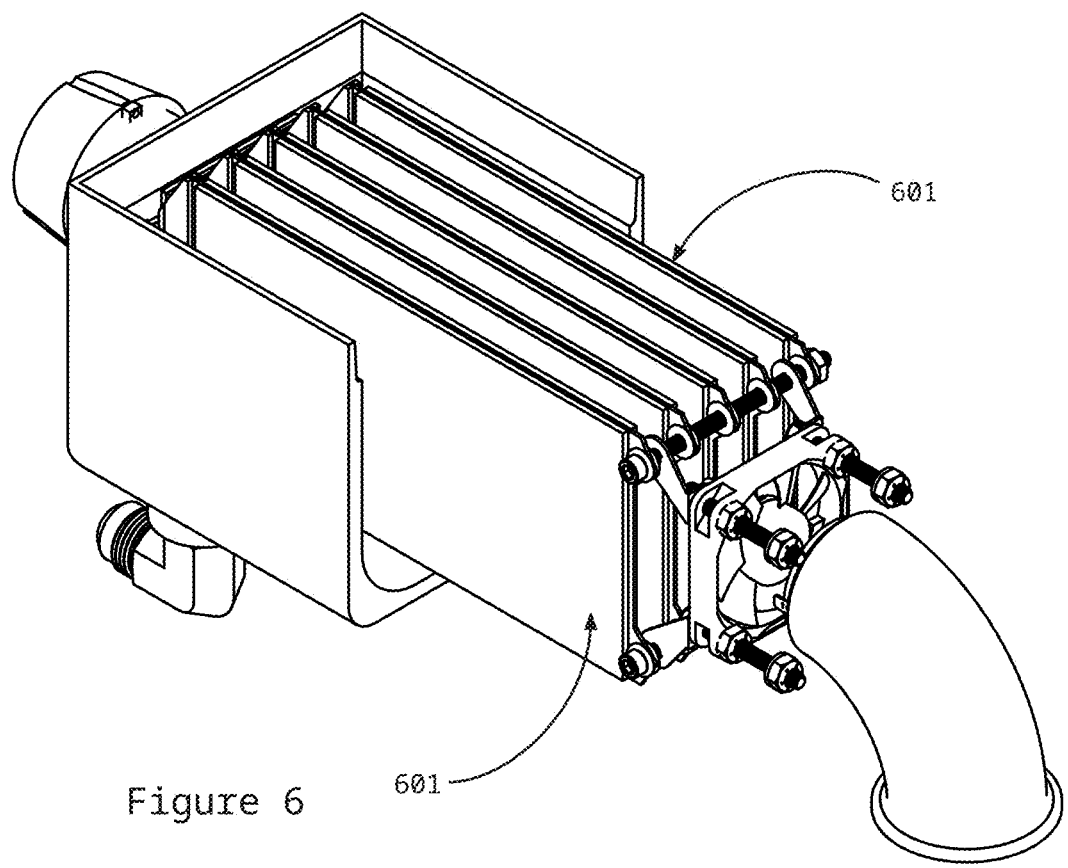
FIG. 6 is a top, front, right perspective view of one embodiment of an AWG with the chamber cut away to show the interior components.
Figure 7:
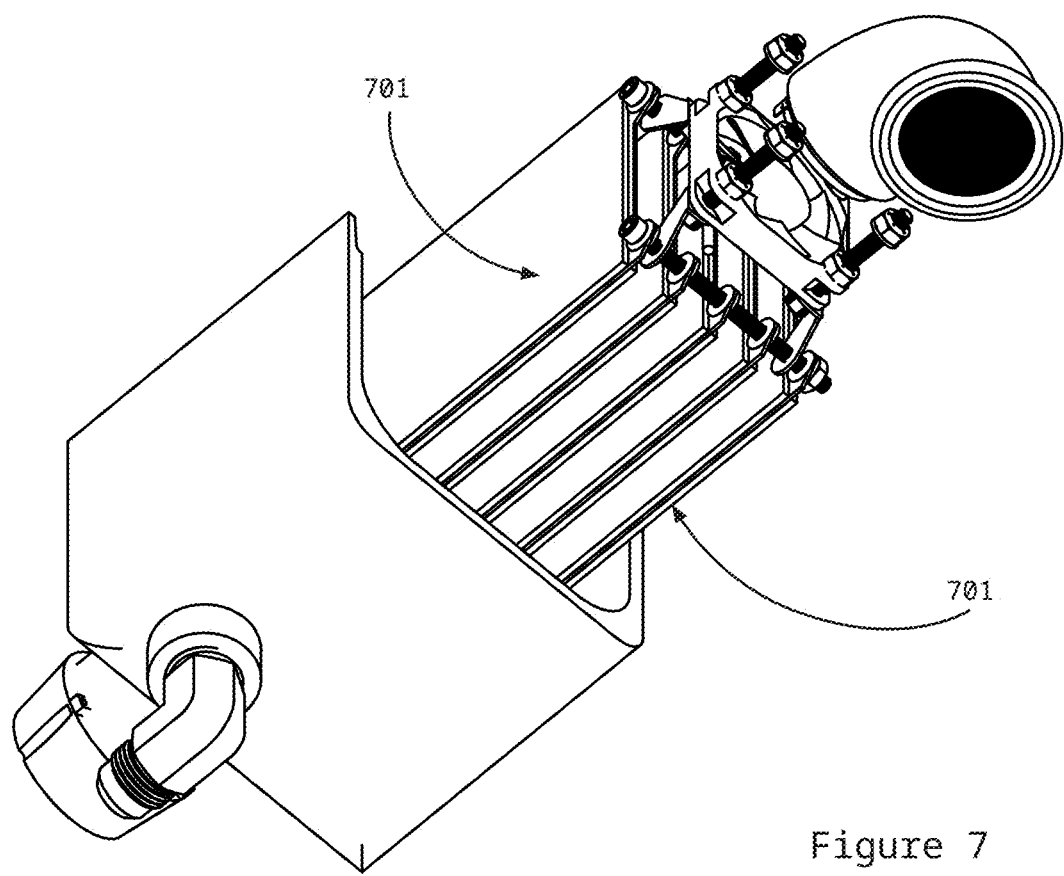
FIG. 7 is a bottom, front, right perspective view of one embodiment of an AWG with the chamber cut away to show the interior components.

The hygroscopic material is housed inside the chamber. One embodiment uses an HCS 601, 701. See FIGS. 6 and 7. An HCS is comprised of a reinforcement material providing structure to a hygroscopic polymer composite. See FIGS. 8-21, showing multiple embodiments of HCS's.

Figure 8:
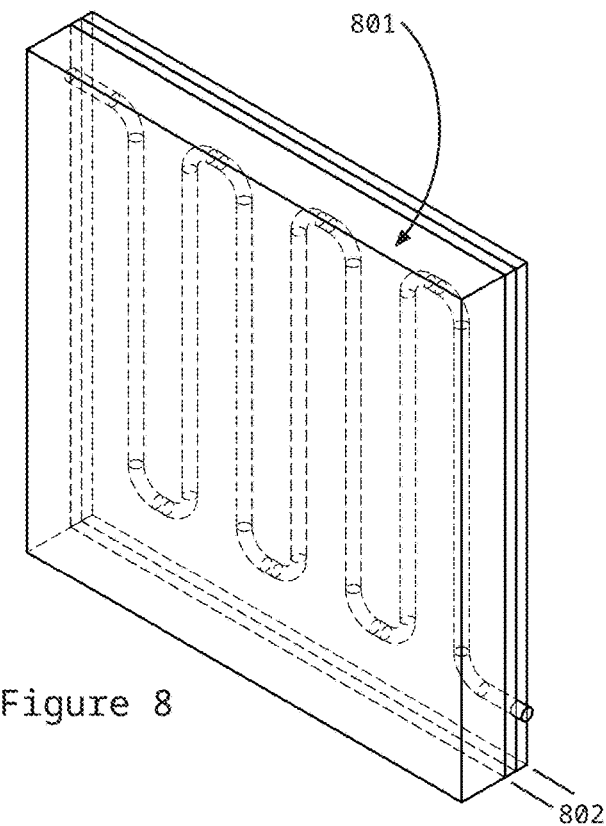
FIG. 8 shows a hygroscopic composite sheet with one layer of hygroscopic polymer film, two layers of reinforcement material, and a resistance heating wire.

See FIG. 8. The reinforcement material 801 may be solid or perforated, a woven or non-woven mesh, a network of wires and/or fibers and/or tubes, a fabric, or a porous solid (e.g., open cell rigid foam). The reinforcement material may be composed of metals, metals combined with natural fibers (e.g., hemp, flax, cotton), carbon nanomaterials (nanoparticles, graphene, nanotubes and nanofibers, etc.), conductive polymers, ceramics, or glass (e.g., highly porous metal-organic framework glasses). The reinforcement material is chosen for suitable properties, including strength, thermal conductivity, electrical conductivity, durability, workability/handling, manufacture, scalability, configuration, shipping, modification, replacement, reuse, recyclability, and/or disposal.

FIG. 8 shows one embodiment of an HCS. A flat sheet of hygroscopic polymer composite 801 is attached to two layers of reinforcement material 802. The purpose of a sheet format is to maximize surface area of the hygroscopic polymer composite. Greater surface area provides an increased rate of absorption, and any embodiment providing additional surface area is envisioned. Multiple thin HCS's may be placed in a single apparatus. This embodiment has one side of the hygroscopic polymer composite exposed to the air.

One embodiment uses an adhesive to attach the composite to the reinforcement material. In one embodiment the reinforcement material may be a copper sheet, with electrical and thermal conductivity. In an alternative embodiment, the reinforcement material is a double-sided tape with thermally conductive and electrically insulative properties. This double-sided tape may be attached to copper sheet or another reinforcement material.

Figure 9:
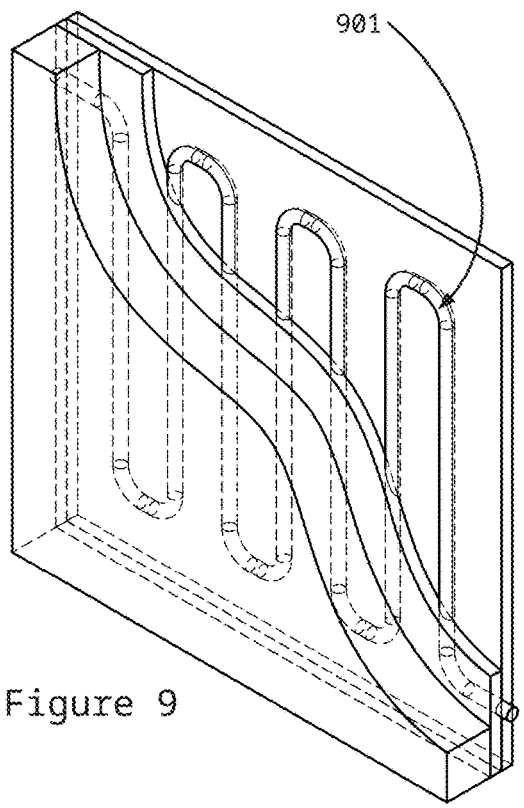
FIG. 9 shows the hygroscopic composite sheet of FIG. 8 with the layer of hygroscopic polymer film and one layer of reinforcement material cut away.

FIG. 9 shows an HCS with the hygroscopic polymer composite and one layer of reinforcement material cut away. A resistance heating wire 901 runs between the two layers of reinforcement material. The wire resists electricity causing it to heat up. In one embodiment, the wire is nichrome. In other embodiments, the wire is an iron-chromium-aluminum alloy, copper-nickel alloy, nickel-iron alloy, nichrome V, stainless steel, or copper-manganese-nickel alloy.

Figure 10:
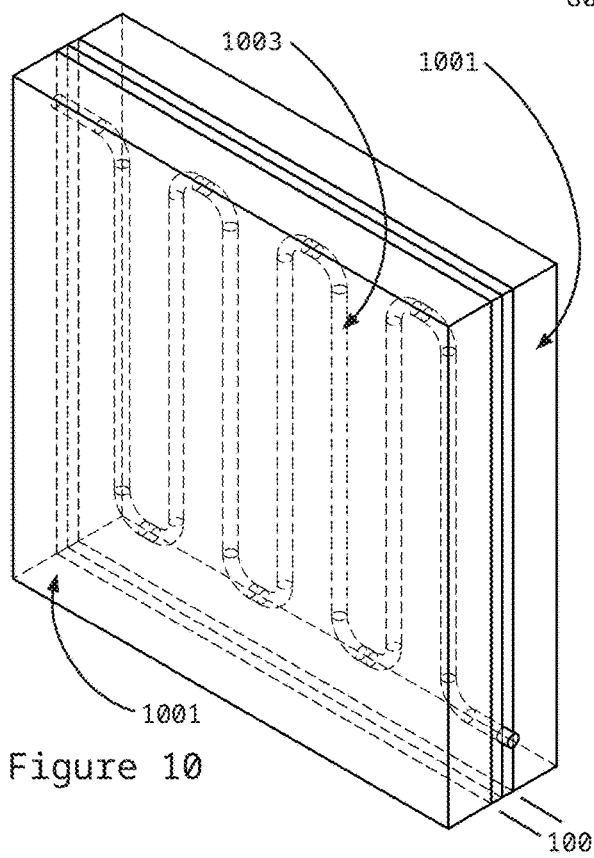
FIG. 10 shows a hygroscopic composite sheet with two layers of hygroscopic polymer film, two layers of reinforcement material, and a resistance heating wire.

One embodiment is an HCS with polymer composite on both sides. FIG. 10 shows an alternative embodiment with two sheets of hygroscopic polymer composite 1001 covering both sides. There are two layers 1002 of reinforcement material between the polymer sheets. A resistance heating wire 1003 runs between the two layers of reinforcement material. The benefit of this embodiment is that both sides of the HCS can absorb/desorb water, greatly increasing efficiency with each cycle.

Figure 11:
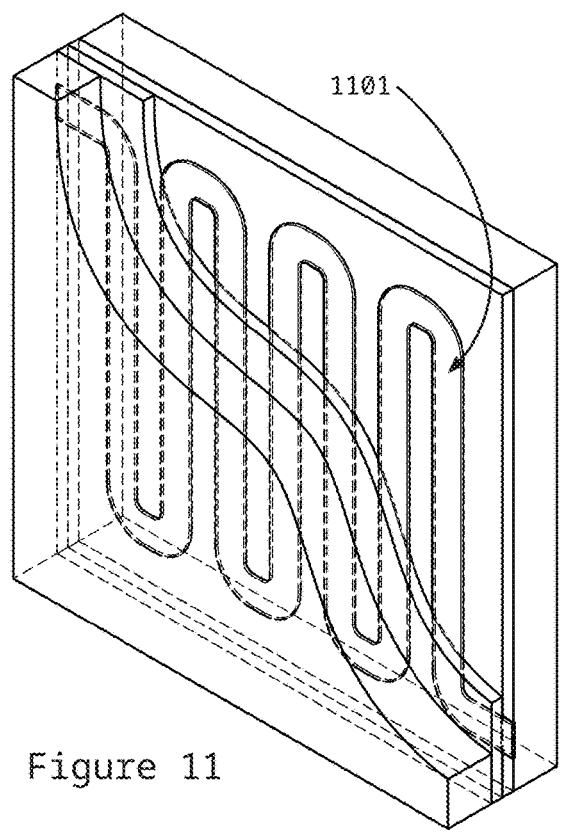
FIG. 11 shows a hygroscopic composite sheet with two layers of hygroscopic polymer film, two layers of reinforcement material, and flat ribbon resistance heating wire, with one layer of film and one layer of reinforcement material cut away.
Figure 12:
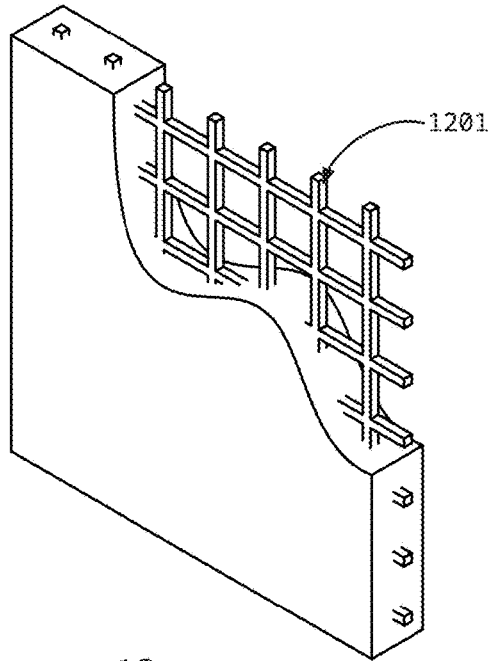
FIG. 12 shows a hygroscopic composite sheet formed by embedding reinforcing material in the polymer composite.
Figure 13:
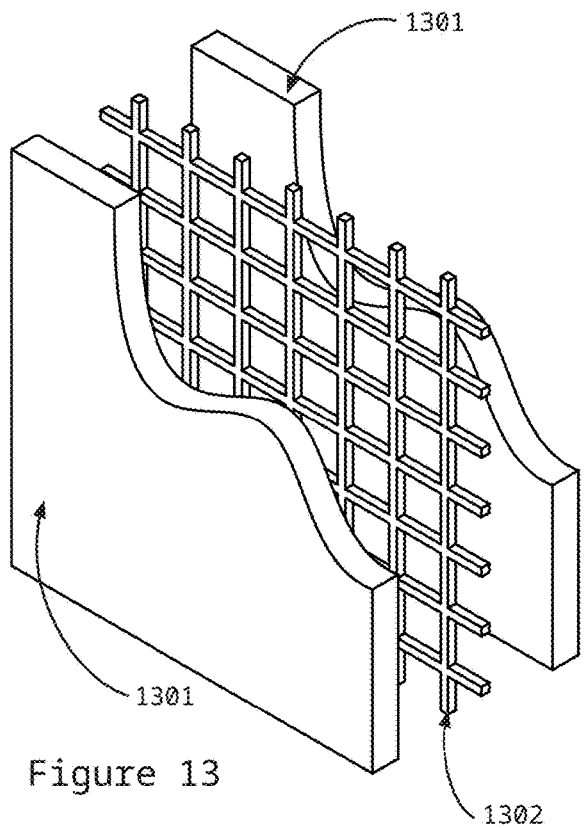
FIG. 13 shows a hygroscopic composite sheet formed by attaching two layers of polymer composite to both sides of reinforcing material.

FIG. 11 shows an alternative embodiment with hygroscopic polymer composite on both sides. This embodiment is comprised of a flat ribbon resistance heating wire 1101 running between the two layers of reinforcement material.

The HCS may be made by casting the composite around the reinforcement material. See FIG. 12. In one embodiment, a mesh reinforcement material 1201 is laid into a bed of solution that has not yet fully gelled. In an alternative embodiment, the HCS is formed by casting two layers of composite 1301 and attaching them to both sides of the reinforcement material 1302. See FIG. 13.

Figure 14:
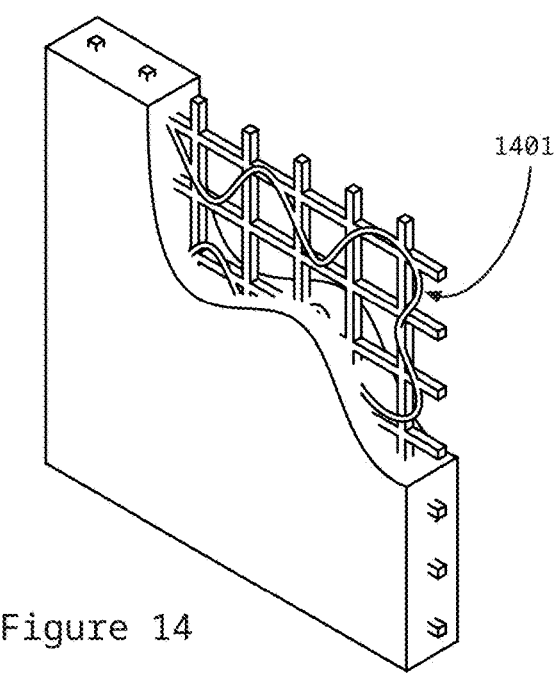
FIG. 14 shows a hygroscopic composite sheet formed by embedding reinforcing material in the polymer composite, with a resistance heating wire providing heat during the desorption phase.
Figure 15:
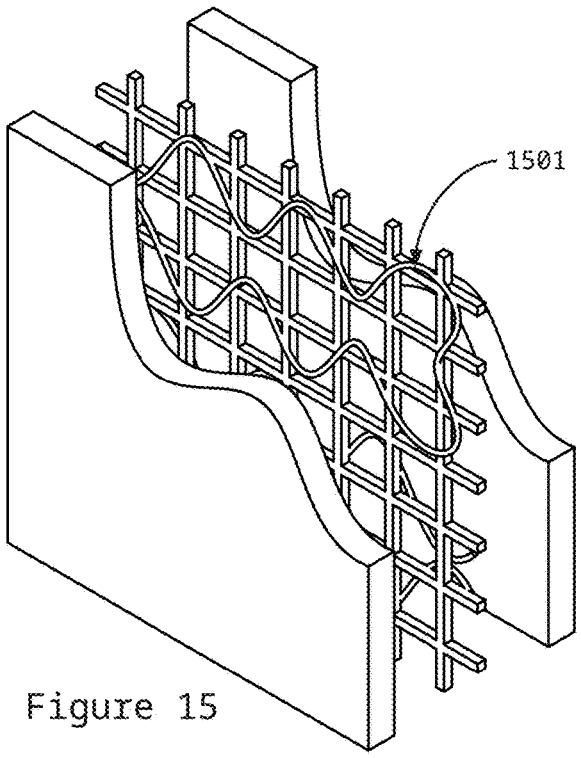
FIG. 15 shows a hygroscopic composite sheet formed by attaching two layers of polymer composite to both sides of reinforcing material, with a resistance heating wire providing heat during the desorption phase.
Figure 16:
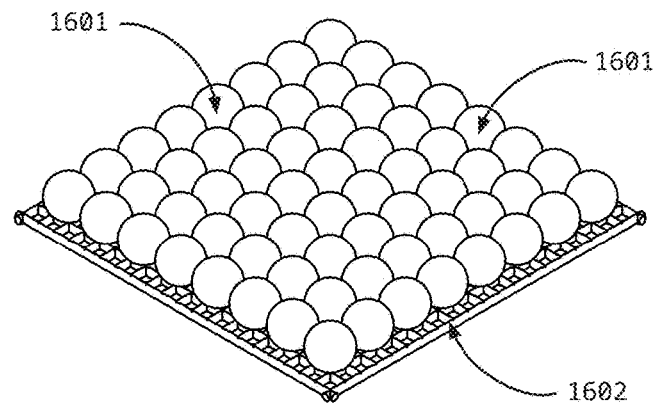
FIG. 16 shows a hygroscopic composite sheet formed by attaching polymer composite spheres to the surface of reinforcing material.

FIGS. 14 and 15 show embodiments with a resistance heating wire 1401, 1501 running along the reinforcement material.

Figure 17:
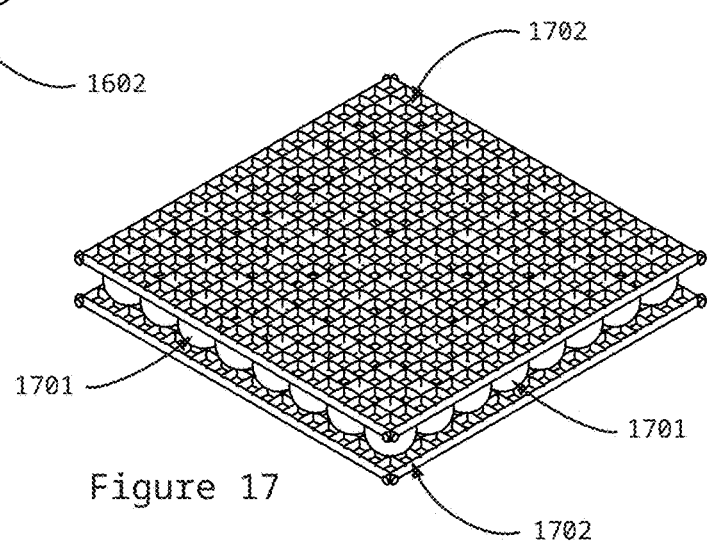
FIG. 17 shows a hygroscopic composite sheet formed by encasing polymer composite spheres between two surfaces of reinforcing material.

In an alternative embodiment, several spheres of hygroscopic polymer composite 1601 are attached to the reinforcement material 1602. See FIG. 16. The spherical shape increases surface area of the composite. FIG. 17 shows an alternative embodiment where the spheres 1701 are encased between two layers of reinforcement material 1702.

Figure 18:
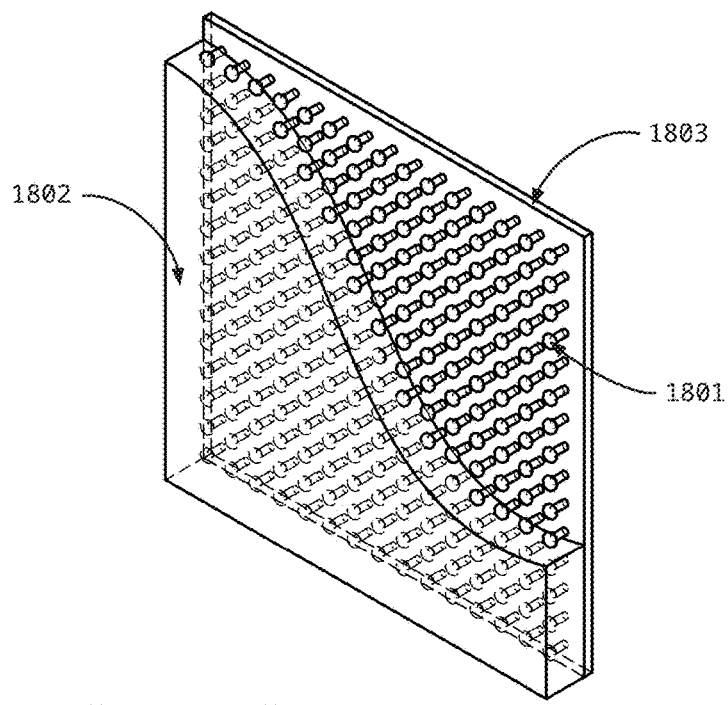
FIG. 18 shows a hygroscopic composite sheet formed by attaching the hygroscopic polymer composite to reinforcement material with several protrusions.

FIG. 18 shows an alternative embodiment where the hygroscopic polymer composite is attached to reinforcement material through a mechanical means. In this embodiment, several protrusions 1801 create anchors to hold the composite 1802 to the reinforcement material 1803.

Figure 19:
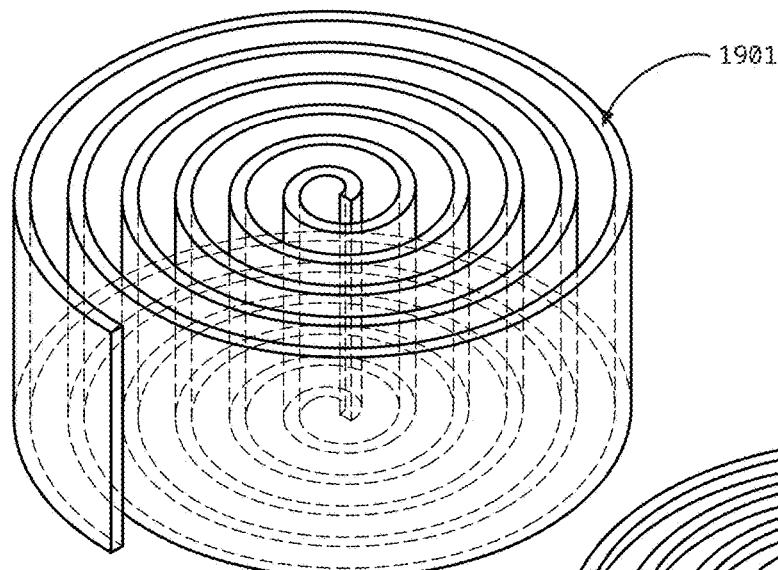
FIG. 19 shows a hygroscopic composite sheet coiled into a spiral form.

Alternative embodiments are comprised of sheets coiled in a spiral, and pleated/folded sheets (origami-like). FIG. 19 shows on embodiment where the HCS 1901 is coiled into a spiral. The HCS may be comprised of the hygroscopic polymer composite, reinforcement material, and a means of heating the HCS. Space between the coils permits air flow across both sides of the HCS.

Figure 20:
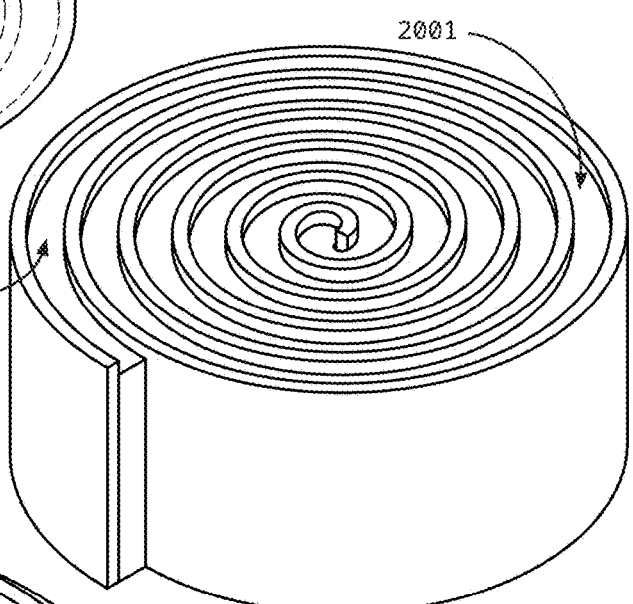
FIG. 20 shows the hygroscopic composite sheet of FIG. 19 with additional spacer media between the surfaces of the coil.
Figure 21:
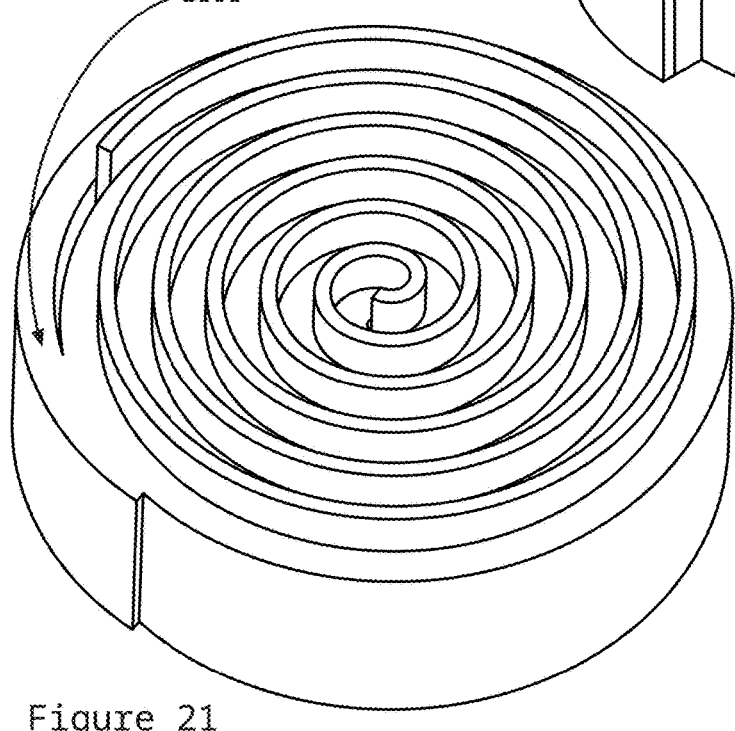
FIG. 21 shows the hygroscopic composite sheet of FIG. 19 with additional spacer media between the surfaces of the coil and around the perimeter.

FIG. 20 shows a spiral embodiment with additional spacer media 2001 between the coils of HCS. The spacer media is an open-celled porous material permitting air flow. The spacer media may also serve as the reinforcement material for the HCS and/or it could be a means to heat the HCS. FIG. 21 is another spiral embodiment comprised of additional spacer media 2101 surrounding the perimeter of the HCS to prevent damage to the HCS, ensure air flow along the outside, and prevent contact with chamber walls.

One benefit of an HCS format is for easy insertion and removal of hygroscopic polymer composite from the apparatus, for cleaning or replacement. Salts in the polymer may degrade over time, thus lowering effectiveness, requiring replacement. In one embodiment, all components of the polymer composite are water soluble and biodegradable, allowing the sheets to be rinsed clean and allowing the washed reinforcement materials to be reused or repurposed.

Heat

Figure 22:
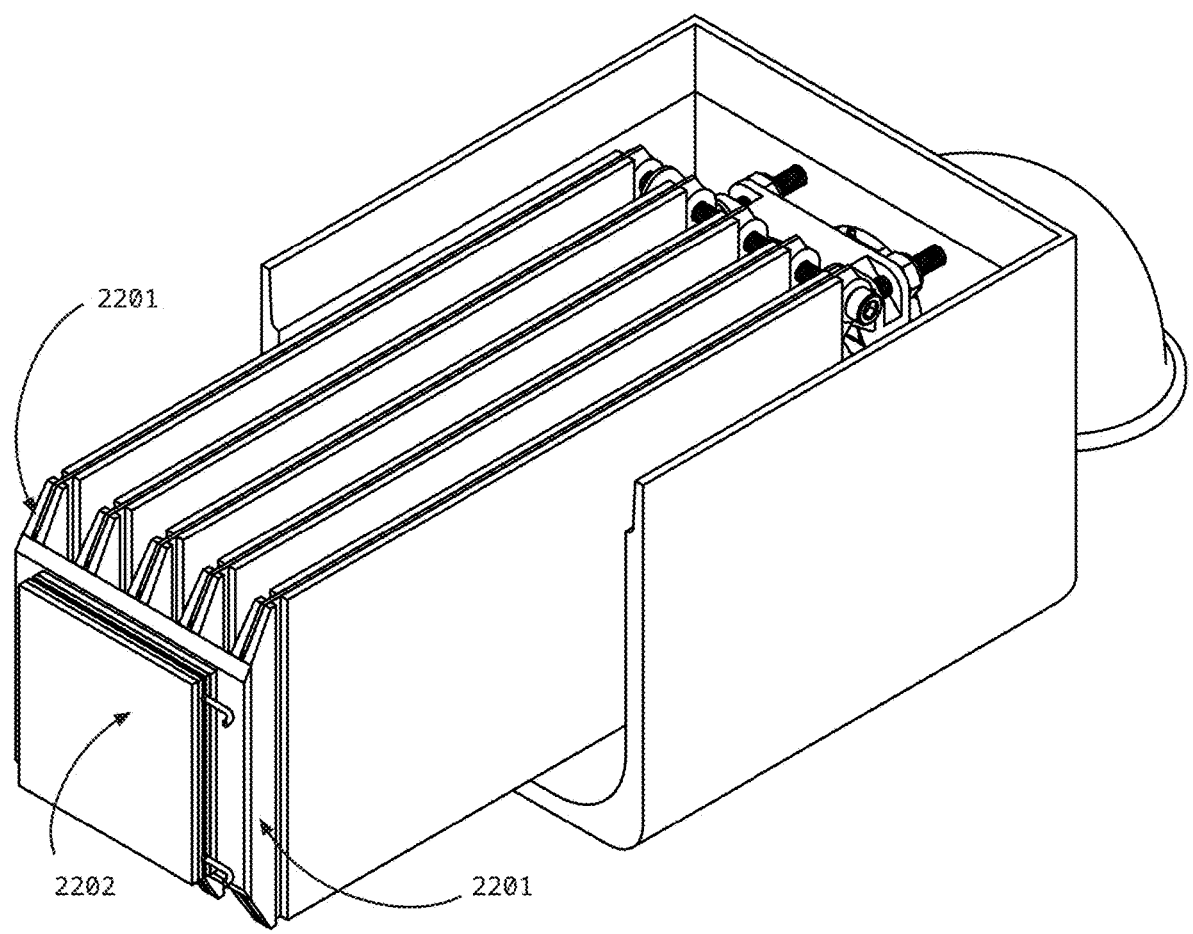
FIG. 22 is a top, front, left perspective view of one embodiment of an AWG with the chamber cut away to show the interior components and thermoelectric device.

The apparatus is comprised of a means of heating the HCS. Conduction, convection, and radiation are envisioned. One embodiment uses solar radiation as the heat source. Various means of heating may operate independently or in conjunction. The heat source may directly heat the HCS through conduction or heat the interior of the chamber and ambiently heat the HCS through convection. In one embodiment, the HCS's are thermally separated from the walls of the chamber. See FIG. 22.

In some embodiments, the reinforcement material facilitates the transfer of heat across the HCS. In one embodiment the reinforcement material is comprised of copper, silver, aluminum, and/or thermally conductive tape. In one embodiment, the HCS is comprised of a layer of hygroscopic polymer composite, a sheet of copper, a layer of double-sided thermally conductive tape, a resistance heating metal wire, a second layer of double-sided thermally conductive tape, and a second sheet of copper. See FIGS. 8 and 9. An alternative embodiment includes a second layer of hygroscopic polymer composite. See FIGS. 10 and 11. The tape allows heat, but not electricity, to pass from the wire to the copper sheet. This facilitates the spread of heat across the HCS without shorting the current in the wire.

In one embodiment, each HCS is attached to a heating fin 2201. The reinforcement material is composed of resistance heating wires that are attached to the heating fin. As the heating fin increases in temperature, the sheet heats as well, increasing the temperature of the hygroscopic polymer composite.

Figure 23:
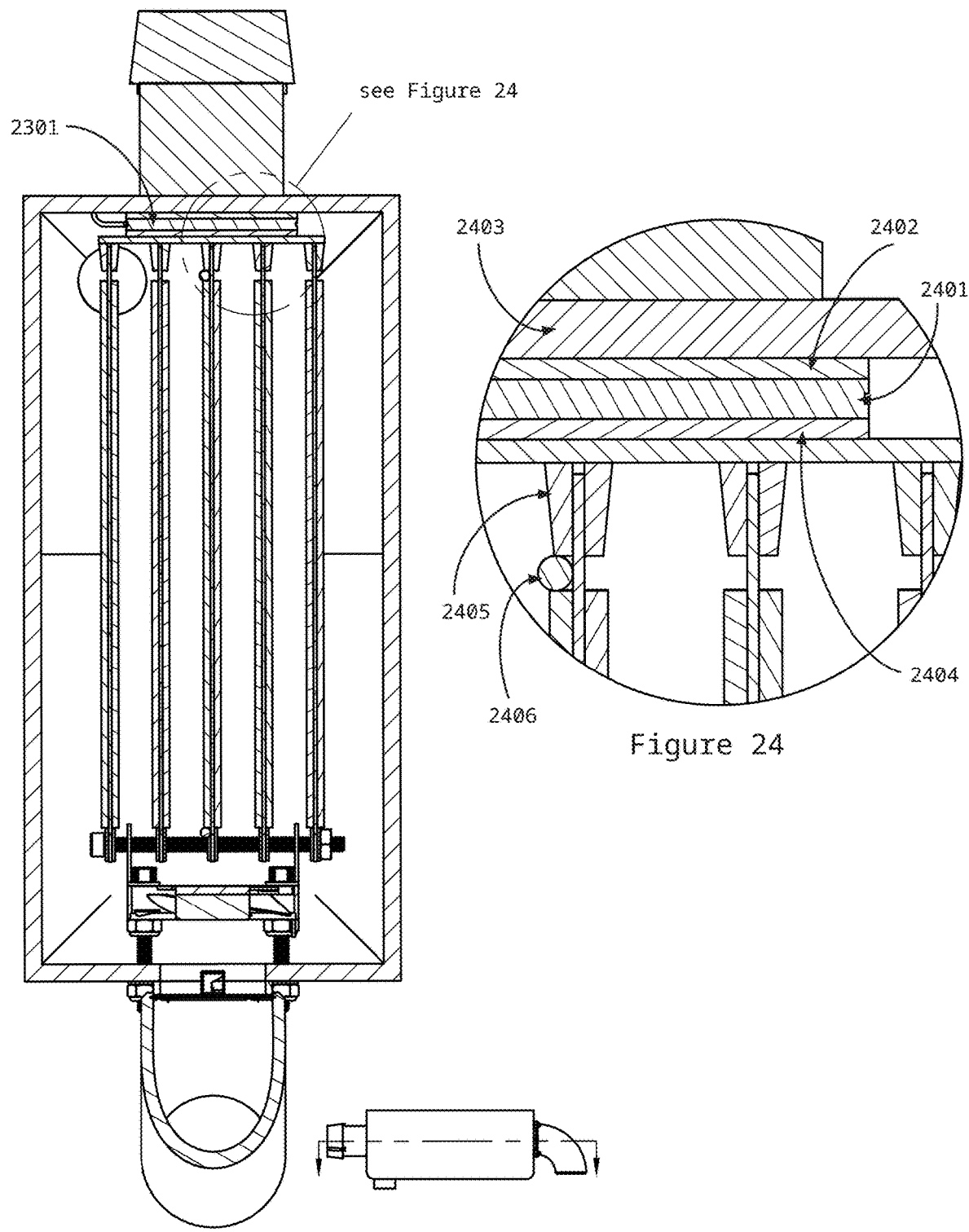
FIG. 23 is a top section cut view of one embodiment of an AWG.
Figure 24:
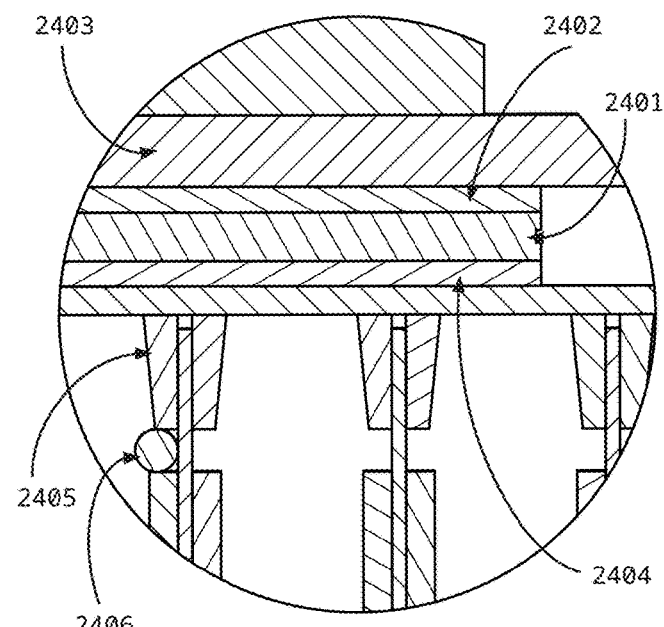
FIG. 24 is a detail of a thermoelectric device connected to the container wall and heating fins.

In one embodiment, a thermoelectric module (e.g., Peltier module) 2202, 2301, 2401 on one end of the chamber heats the heating fins. See also FIGS. 23 and 24. The cold side 2402 of the thermoelectric module cools the wall 2403 of the chamber. Simultaneously, the hot side 2404 of the thermoelectric module heats the heating fins 2405 attached to the HCS. Some embodiments also have a heat sensor on each HCS to measure temperature 2406.

Figure 25:
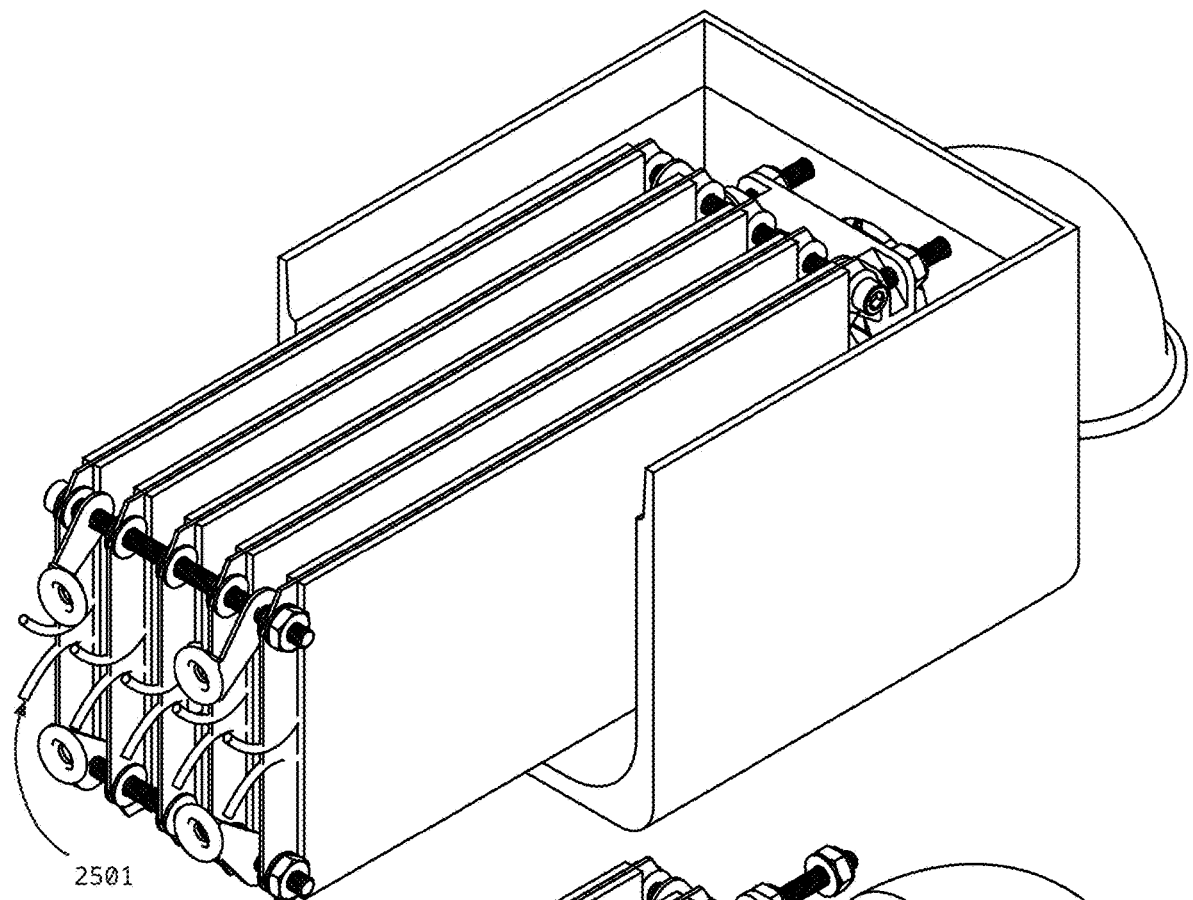
FIG. 25 is a top, front, left perspective view of one embodiment of an AWG with the chamber cut away to show the interior components and an integrated resistance heating wire.
Figure 26:
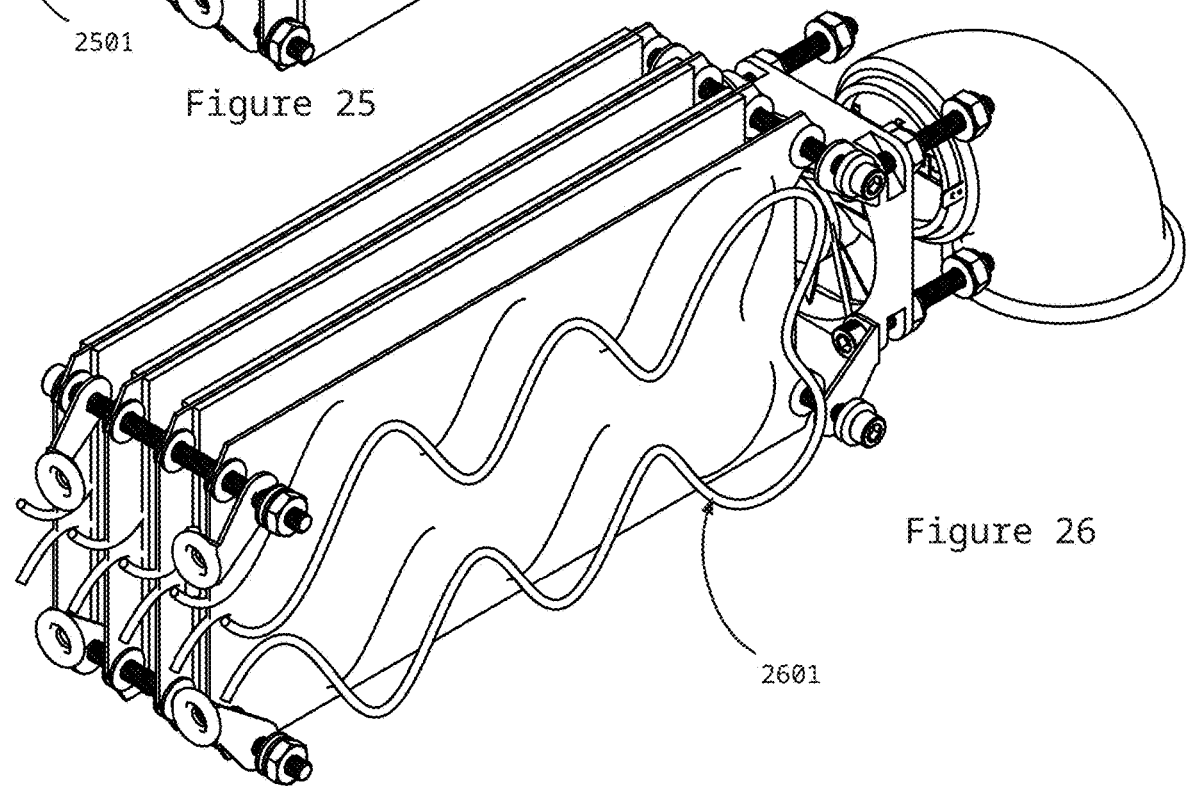
FIG. 26 is a top, front, left perspective view of one embodiment of an AWG with the chamber and polymer composite removed to show the interior components and an integrated resistance heating wire.

In one embodiment, the HCS is equipped with an integrated resistance heating wire 2501, 2601. See FIGS. 25 and 26. The integrated resistance heating wire 2501, 2601 runs throughout the reinforcement material of the HCS, supplying heat to the polymer composite.

Absorption Phase

The apparatus operates in two phases: absorption and desorption. The absorption phase occurs at a lower temperature, and the desorption phase occurs at a higher temperature.

Figure 27:
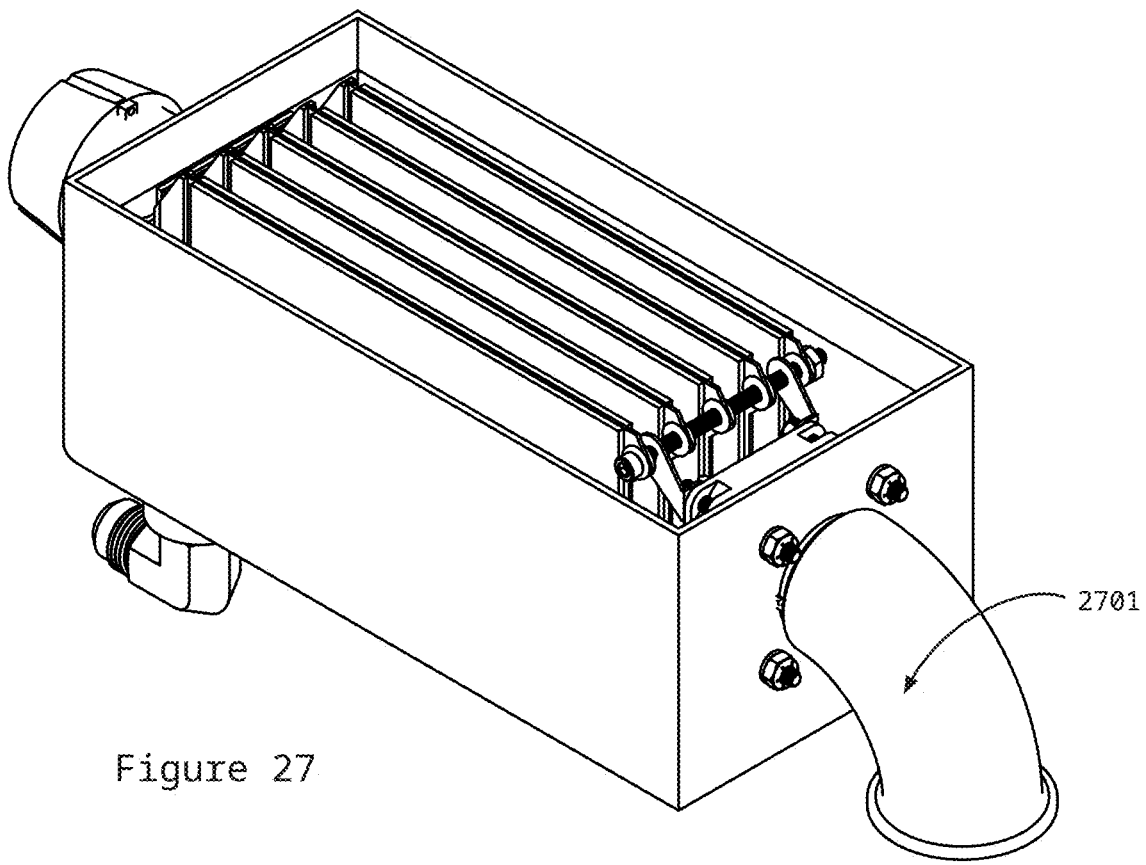
FIG. 27 is a top, front, right perspective view of one embodiment of an AWG with the lid removed.
Figure 28:
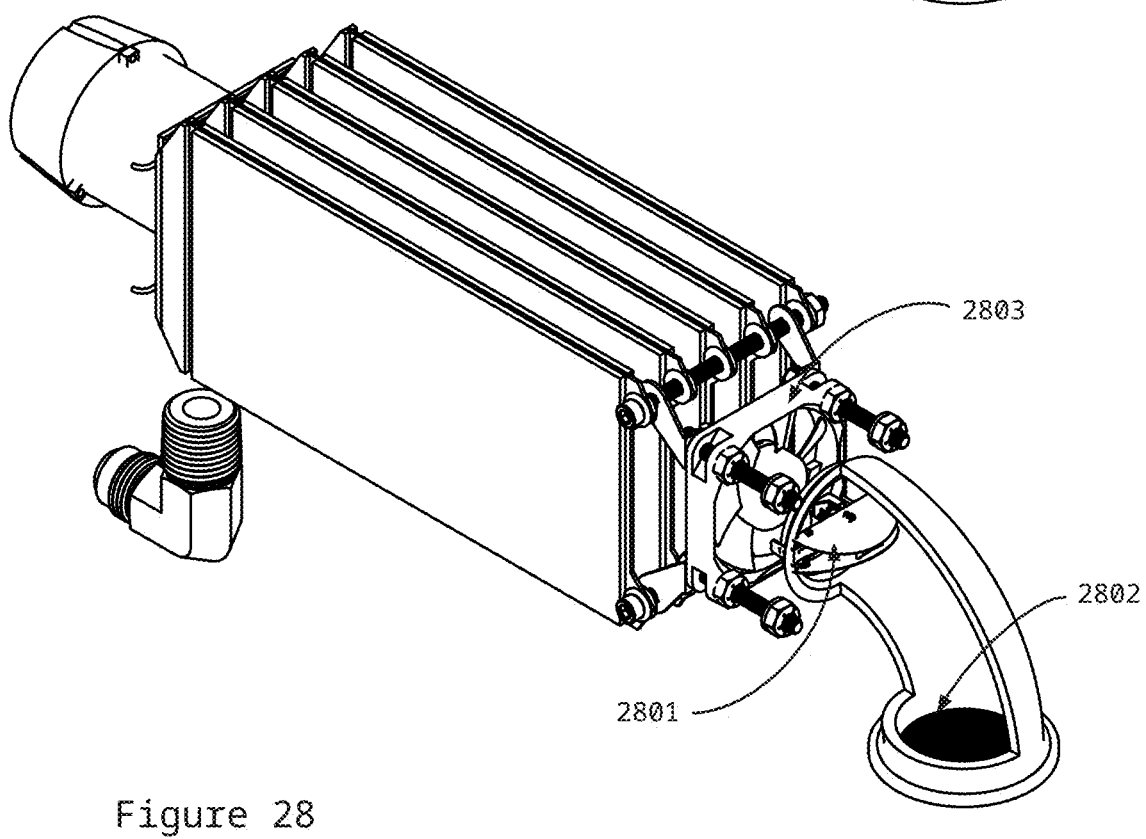
FIG. 28 is a top, front, right perspective view of the interior components of one embodiment of an AWG.

In one embodiment, the apparatus is comprised of an air intake 2701, and an exhaust vent. See FIG. 27. One embodiment includes a valve on the air intake and a valve on the exhaust vent. Both are open during the absorption phase to allow air to circulate through the chamber, and across the surface of the hygroscopic polymer composite. See FIG. 28, showing an open valve 2801 on the air intake.

Some embodiments include a filter 2802 on the air intake. The filter may prohibit dust, particulates, spores, seeds, insects and other animals, and microbes from entering the apparatus.

Some embodiments include a fan 2803 to aid circulation. The fan may be inside the chamber, or at the air intake. As the fan operates, it pulls air through the air intake. One embodiment has a damper, which opens automatically with air flow. Some embodiments are comprised of reversable fans to adjust air flow during different phases. Other embodiments utilize impeller fans. Alternative embodiments may circulate air through wind or convection.

Figure 29:
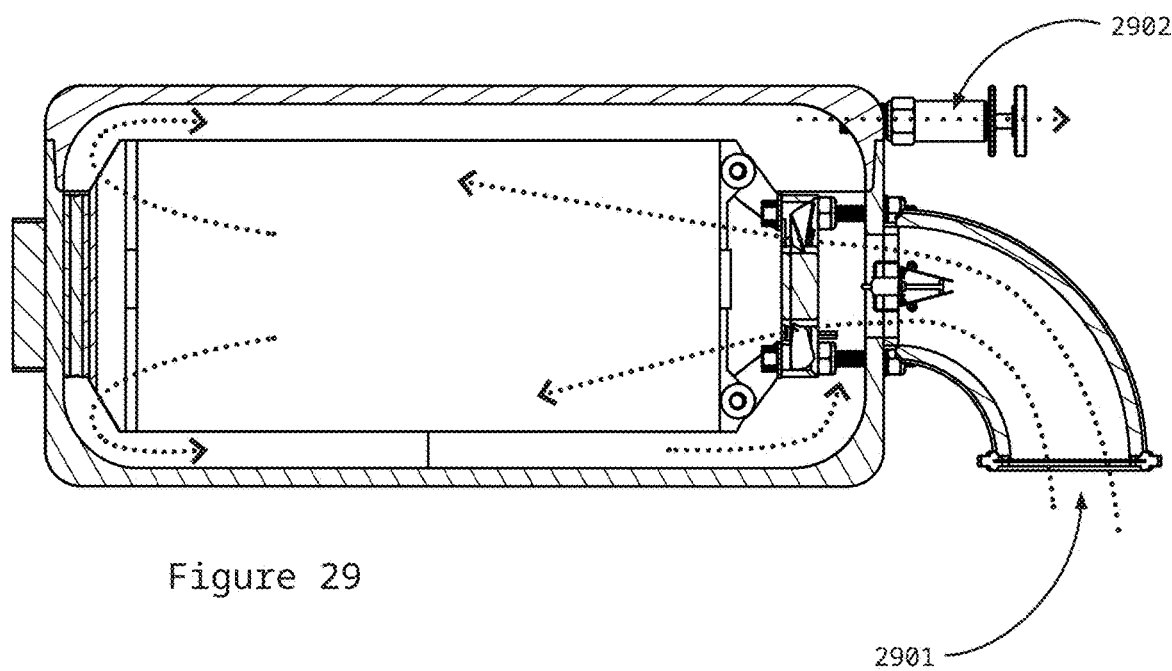
FIG. 29 is a front section cut view of one embodiment of an AWG showing air flow during the absorption phase.
Figure 30:
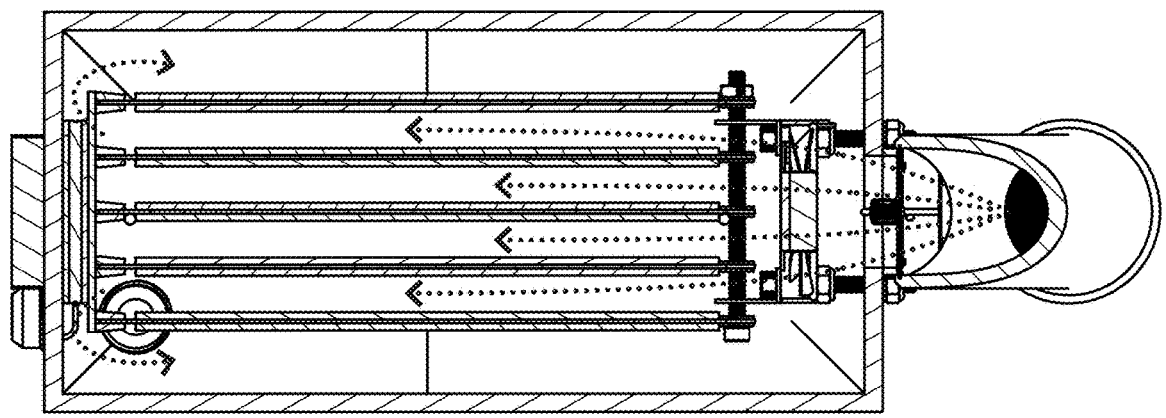
FIG. 30 is a top section cut view of one embodiment of an AWG showing air flow during the absorption phase.

Air 2901 circulates within the chamber and exits through the exhaust vent 2902. See FIGS. 29 and 30. As the air circulates, it crosses over the surface of one or more HCS's. See FIG. 30. The larger volume of air that passes through the chamber, the greater the opportunity for the hygroscopic polymer composite to absorb water vapor.

Figure 31:
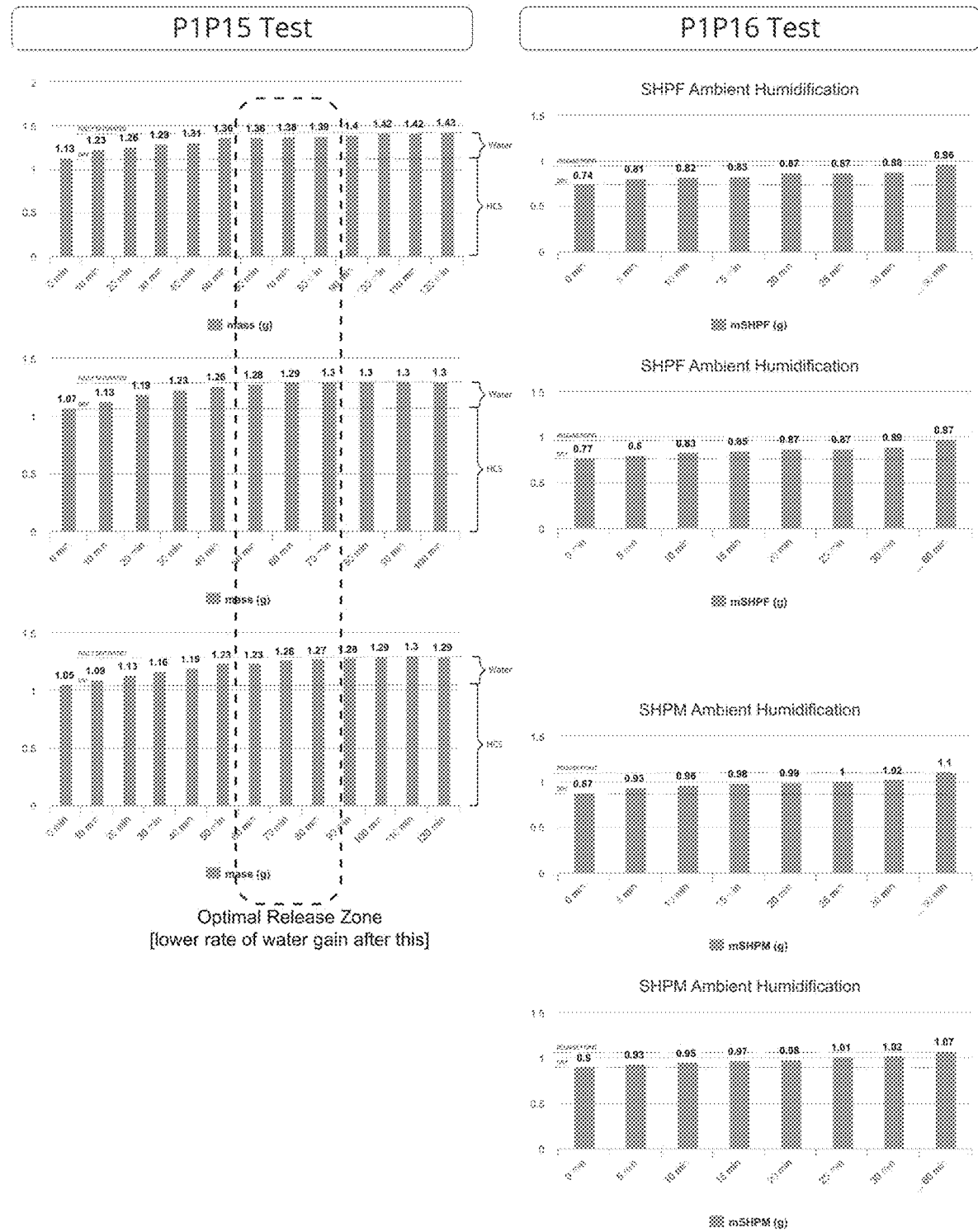
FIG. 31 shows multiple charts demonstrating absorption rates.

Over time, the rate of absorption diminishes as the polymer composite becomes more saturated. FIG. 31 shows several tests where the absorption rate decreases substantially around sixty minutes. In some embodiments, it may take several hours to reach the full saturation point (100% saturated), but only several minutes to reach the half saturation point (50% saturated). In one embodiment, the hygroscopic polymer composite reaches around 50% of full saturation at thirty minutes, and 75% saturation at fifty minutes. Absorption rates depend on relative humidity and other environmental conditions.

Figure 32:
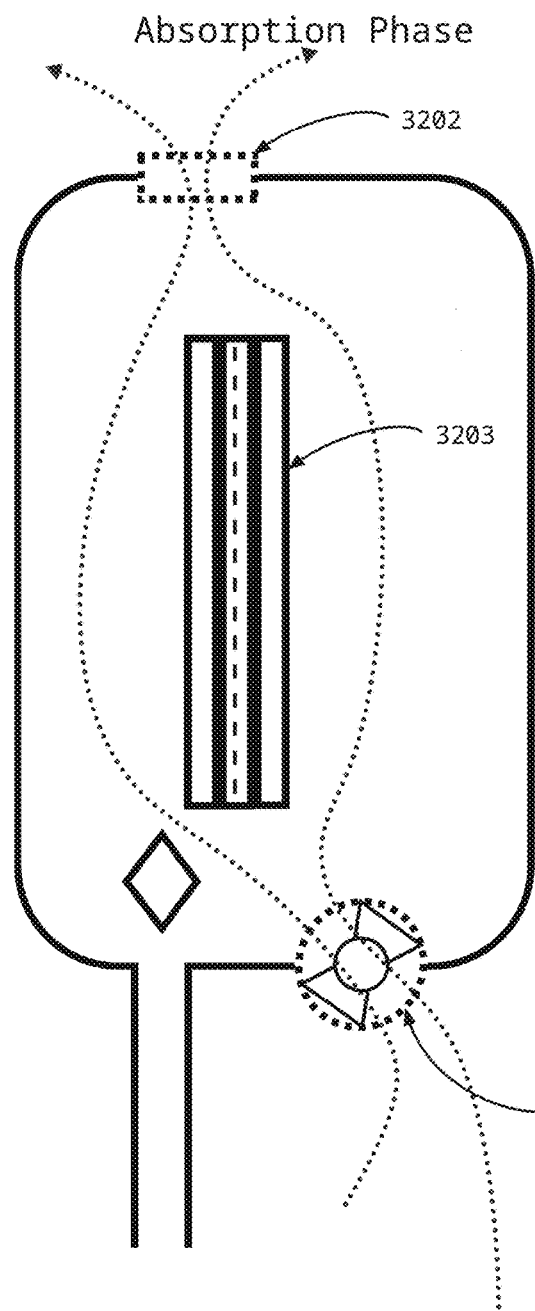
FIG. 32 shows a diagram of the absorption phase.

FIG. 32 shows a diagram of one embodiment of the apparatus during the absorption phase. In some embodiments, the air intake 3201 and the exhaust vent 3202 are positioned on opposite ends of the chamber to facilitate air flow across the HCS 3203. The air intake and the exhaust vents are open and air flows through the chamber. As the air flows through the chamber and across the HCS, the hygroscopic polymer composite absorbs moisture from the air.

Desorption Phase

Figure 33:
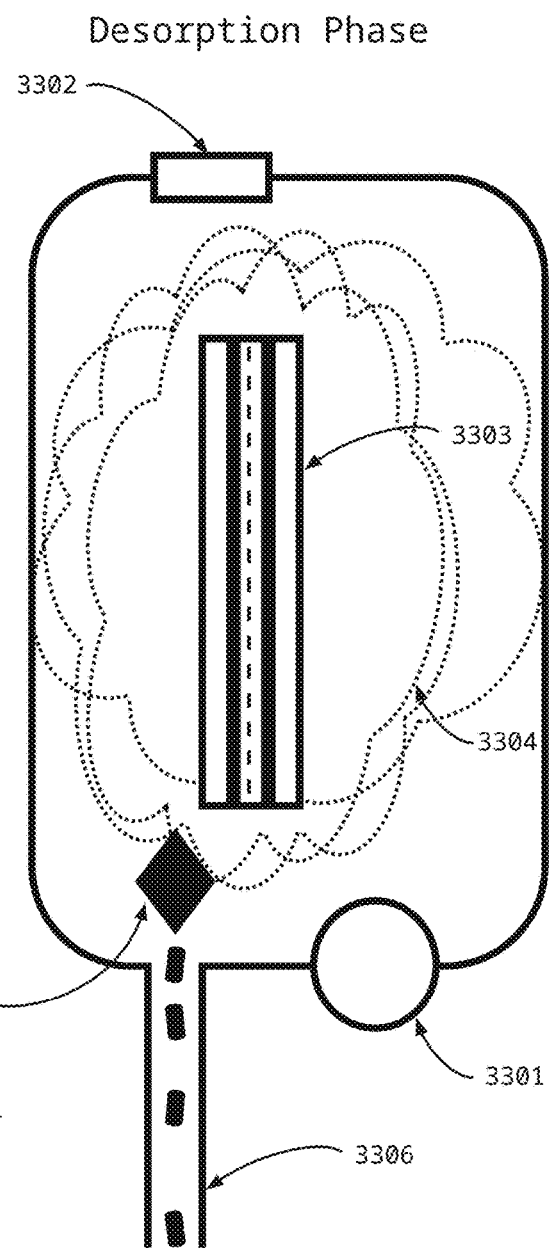
FIG. 33 shows a diagram of the desorption phase.

FIG. 33 shows a diagram of one embodiment of the apparatus during the desorption phase. The air intake 3301 and the exhaust vent 3302 are closed. The HCS 3303 is heated causing the hygroscopic polymer composite to desorb moisture in the form of water vapor 3304. Some embodiments are equipped with a condensation surface 3305. This surface collects and condenses water vapor, which then exits through a drain 3306 as liquid water.

Figure 34:
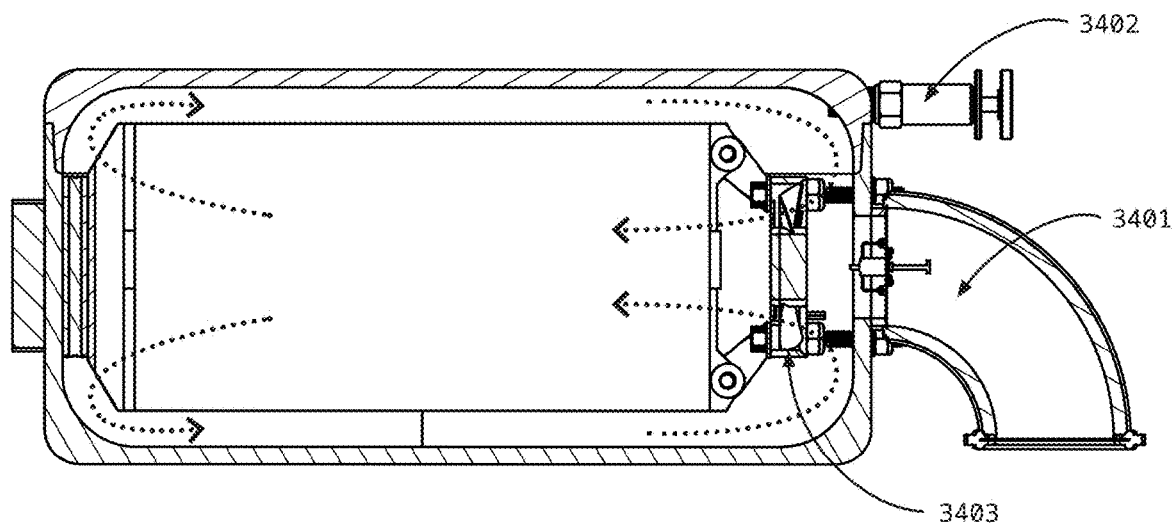
FIG. 34 is a front section cut view of one embodiment of an AWG showing air flow during the desorption phase.

The desorption phase follows the absorption phase. See FIG. 34. The air intake 3401 and the exhaust vent 3402 are closed to prohibit any water vapor from leaving the chamber. The polymer composite is heated, bringing the temperature to the point where the hygroscopic material becomes hydrophobic and starts expelling water vapor.

Figure 35:
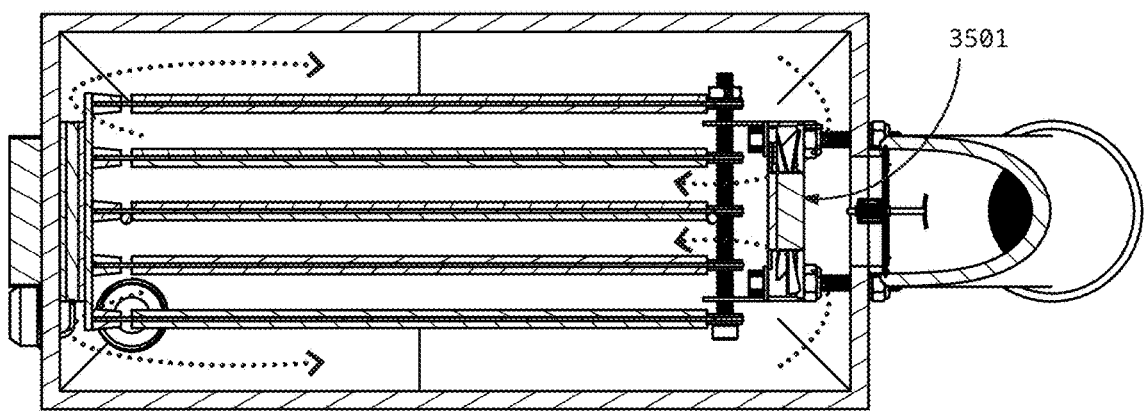
FIG. 35 is a front section cut view of one embodiment of an AWG showing air flow during the desorption phase.
Figure 36:
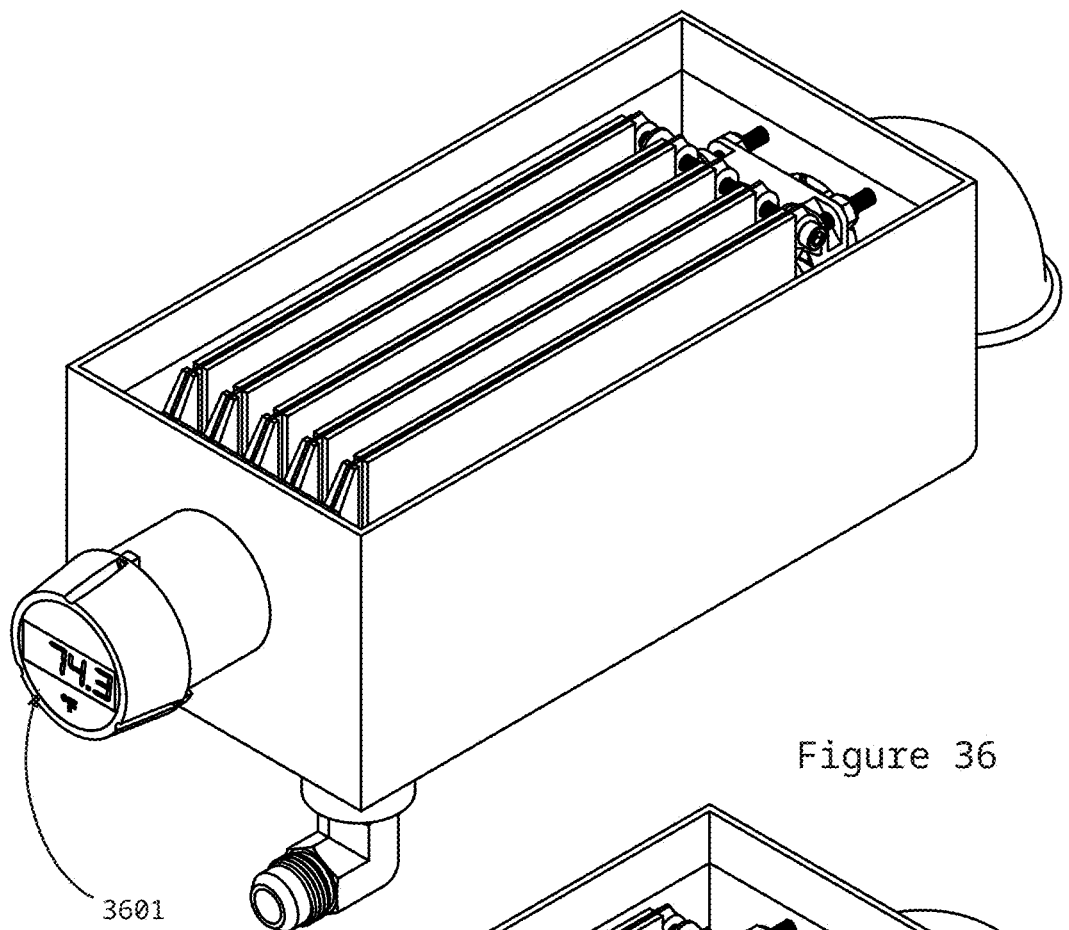
FIG. 36 is a top, front, left view of one embodiment of an AWG with a display and the lid removed.

The water vapor fills the interior of the chamber. Some embodiments include a fan 3403, 3501 to help the air circulate throughout the interior. See also FIG. 35. Alternative embodiments may not require a fan, as the air circulates via convection. Some embodiments include a heat sensor and display 3601. See FIG. 36.

Figure 37:
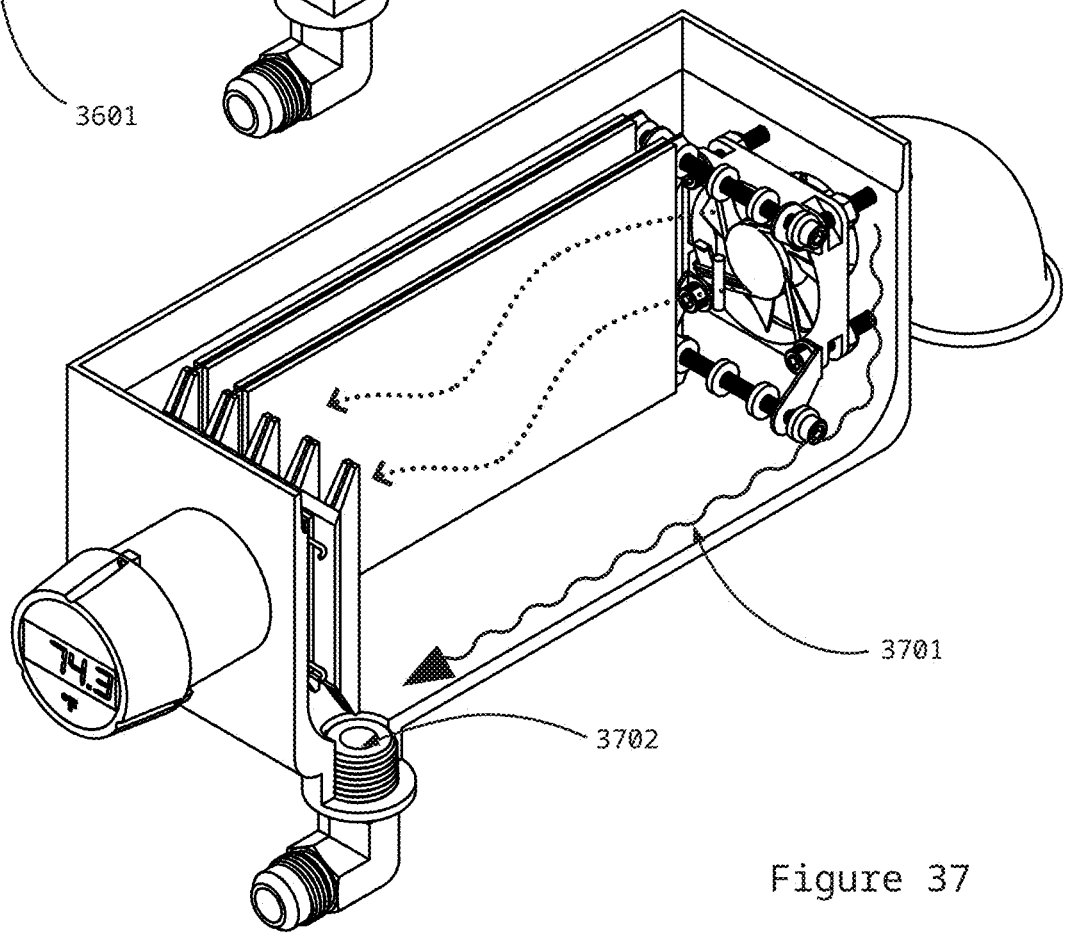
FIG. 37 is a top, front, left view of one embodiment of an AWG with the front wall of the container, lid, and several hygroscopic composite sheets removed.

The water vapor is condensed and collected. See FIG. 37. In one embodiment one or more surfaces are cooled inside the chamber to facilitate condensation. One surface could be the interior of the chamber itself. A thermoelectric device, used for heating the HCS's, has a cold side which could provide a means of cooling the surface.

Alternative embodiments do not require active cooling, as the condensation surface temperature is already suitable. Alternative embodiments use a hydrophobic surface for condensation in place of, or in addition to, a cool surface. This hydrophobic surface may include interspersed hydrophilic regions that attract water vapor to aid collection.

Another embodiment may include a means of shaking/vibrating the condensation surface to aid drainage.

In one embodiment, the water 3701 is collected in the bottom of the chamber and drained out of the apparatus. The bottom of the chamber may be sloped to allow gravity to carry condensed water to the drain. Some embodiments include water filter, P-trap, and/or valve at the drain 3702.

A desorption cycle may last several minutes. In one embodiment, the desorption cycle lasts sixty minutes. Once the polymer composite is sufficiently desorbed, the apparatus can transition to an absorption cycle.

Figure 38:
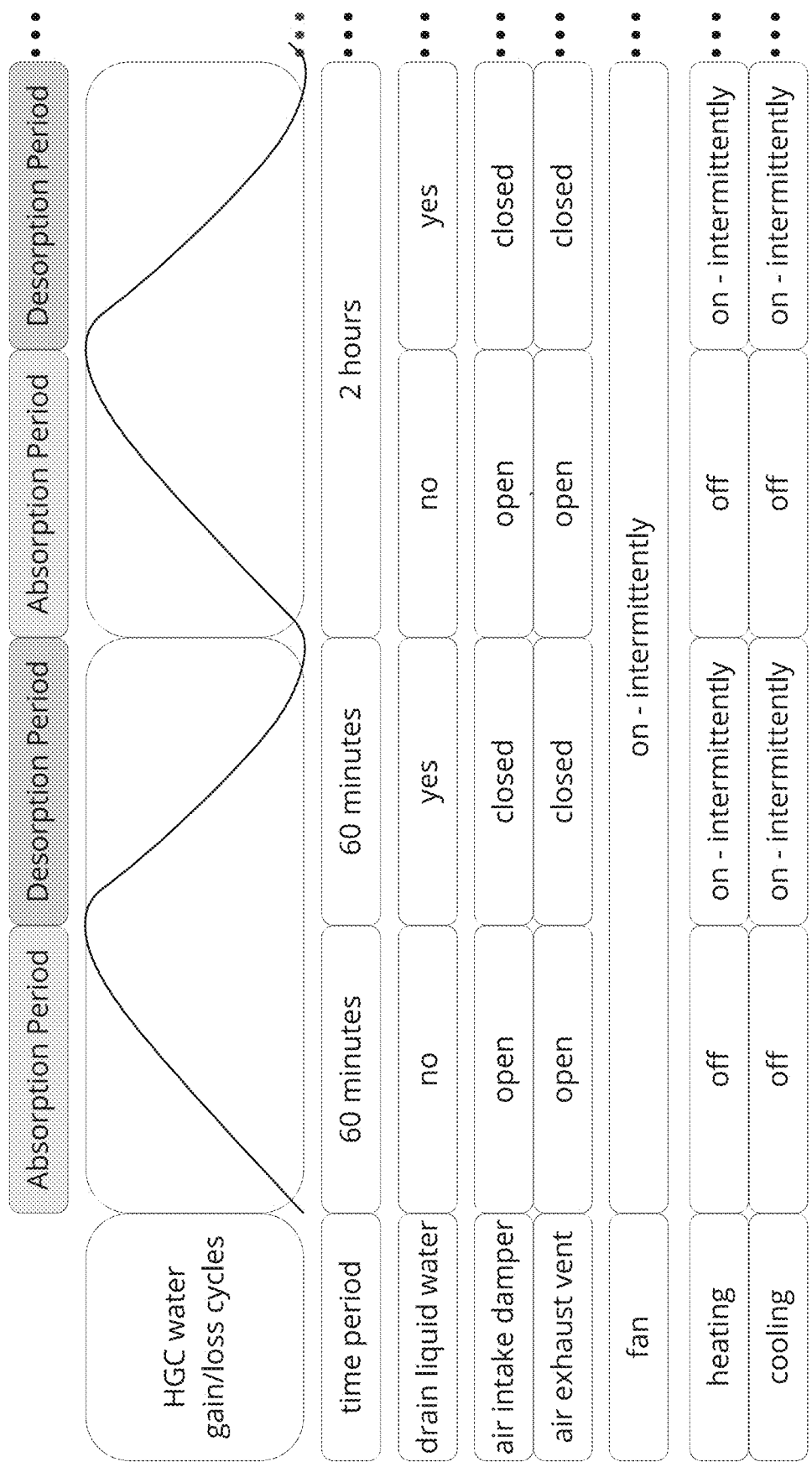
FIG. 38 is a chart showing two absorption/desorption cycles.
Figure 39:
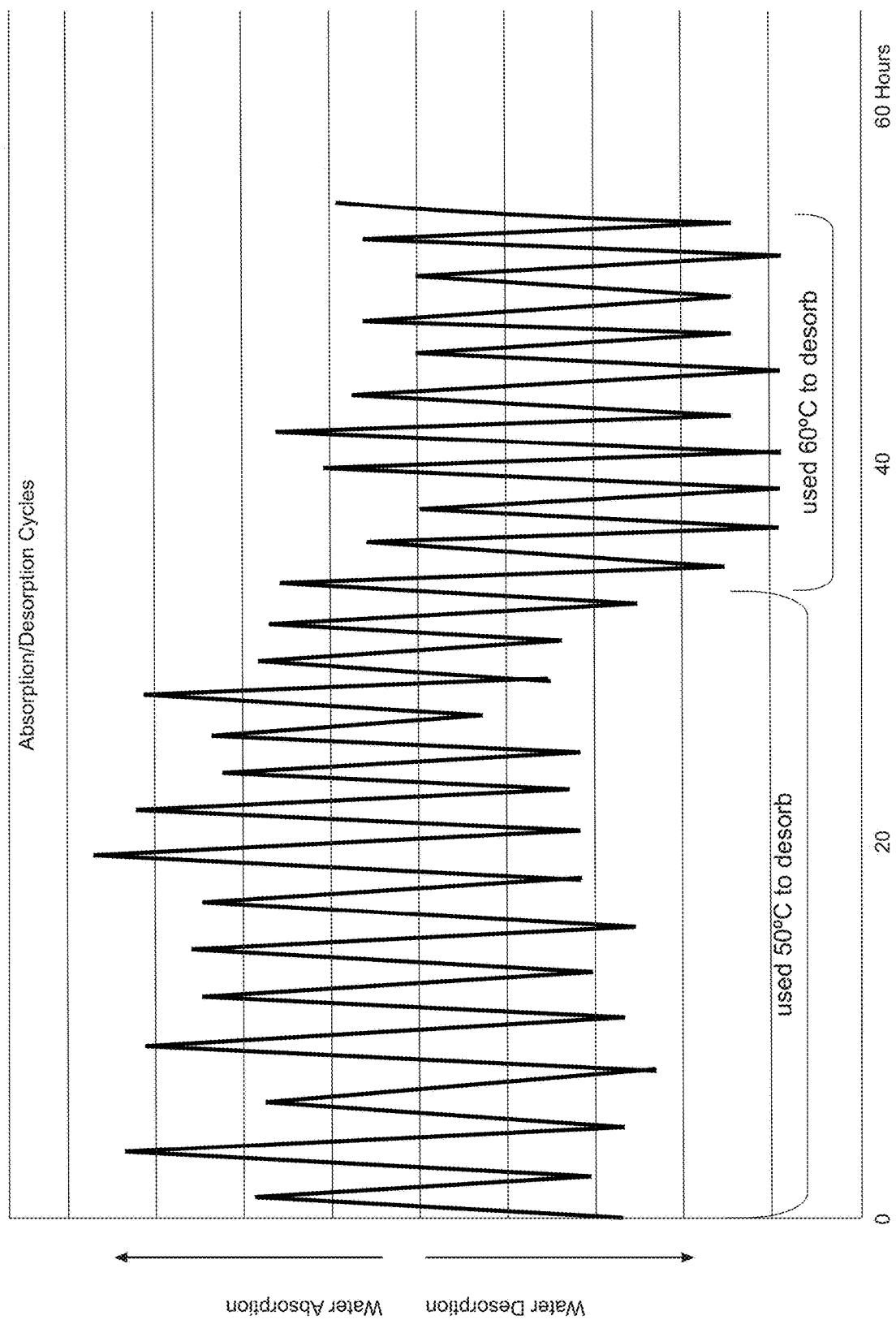
FIG. 39 is line graph showing multiple absorption/desorption cycles at two desorption temperatures.

FIG. 38 shows two complete absorption/desorption cycles. In this embodiment, the absorption and desorption phases are each set to sixty minutes. Alternative phase lengths are envisioned and are dependent on HCS performance and environmental factors. FIG. 39 shows several absorption/desorption cycles over the course of more than two days. The heating temperature during the desorption phases was increased from 50-Celsius to 60-Celsius to demonstrate changes in cycle times and saturation levels. As the temperature was increased, desorption rates increased, but overall saturation levels dropped.

Heating temperature during the desorption phase may be adjusted for individual devices to improve performance. In one embodiment, the heating temperature is at or above 50 C. The target absorption temperature may be below 40 C. The range between the heating temperature for desorption and the lower temperature for absorption is variable dependent upon atmospheric and material conditions.

Additional Elements

Some embodiments include various controls and meters to manage the apparatus. One embodiment is further comprised of electronics, including a processor, memory, receiver, transceiver, sensors, transformers, and power source. The electronics include a means of opening and closing the air intake, exhaust vent, and drainage valves and turning the heating/cooling elements on and off. The receiver/transceiver sends signals providing information and receives signals for remote operation of controls.

In one embodiment, a power source is a photovoltaic solar cell. The solar cell could also serve as means of shading the apparatus from solar radiation in addition to generating electricity.

One embodiment includes temperature sensors and controls. Locations of temperature sensors include the HCS, ambient air inside the chamber, air outside the chamber, and the condensation surface. One embodiment includes weight sensors to monitor the weight of HCS's, to assess saturation levels. One embodiment is also equipped with hygrometers on the interior and exterior of the apparatus.

The apparatus may include a means of displaying the status of measurements and operation of the absorption/desorption cycles.

Optimizing Cycles

One advantage of utilizing a temperature-controlled chamber with a heating element, is that hygroscopic absorption/desorption cycles can be optimized to greater efficiency over devices subject to the day/night cycle. Additionally, seasonal sunlight, cloudy weather, shadows cast upon the container, or adverse temperatures are eliminated as factors.

Additionally, the frequency of heating and reheating on successive desorption cycles could help reduce microbial growth.

During the absorption phase, the rate of absorption can be increased through monitoring of performance. The rate of absorption diminishes as the hygroscopic material becomes saturated. It is more efficient over time to transition to desorption prior to full saturation.

Likewise, the desorption cycle may be optimized by increasing heat to a specific temperature and controlling the temperature of the condensation surface.

Many absorption/desorption cycles can occur throughout a single day, and continue throughout the night, resulting in the highest possible water generation. In one embodiment, the apparatus can perform twelve absorption and desorption cycles in a single 24-hour period.

Additionally, absorption/desorption may be optimized over time by monitoring the performance of individual HCS's in a single apparatus. As one HCS starts to degrade, it can be replaced.

The apparatus is scalable as an individual unit or as a system. The larger a single apparatus, the greater amount of hygroscopic material it can possess and the more water it can harvest in a single cycle.

Additionally, multiple apparatuses can operate in unison. They can share resources, such as the electronics, fan, drainage, and power source.

Alternatively, two or more apparatuses could operate in tandem, with one operating an absorption phase while the other is in a desorption phase. This would ensure a continuous supply of water and would reduce surges in power demand because they are not all being heated at the same time.

Figure 40:
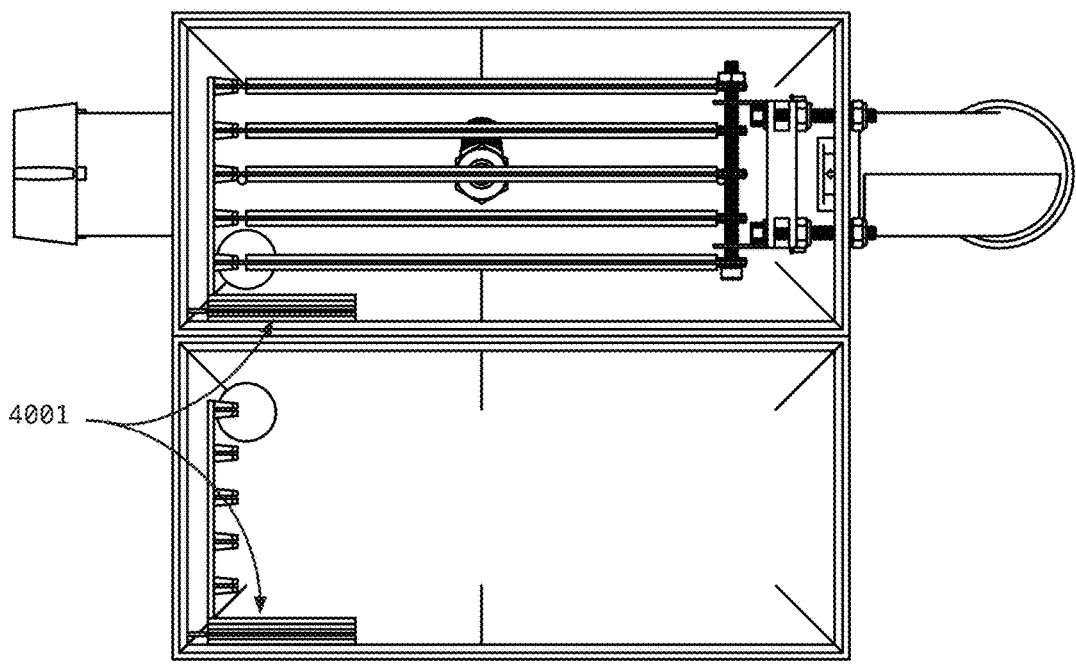
FIG. 40 is a top view of two AWGs operating in a system, one AWG has several hygroscopic composite sheets removed.
Figure 41:
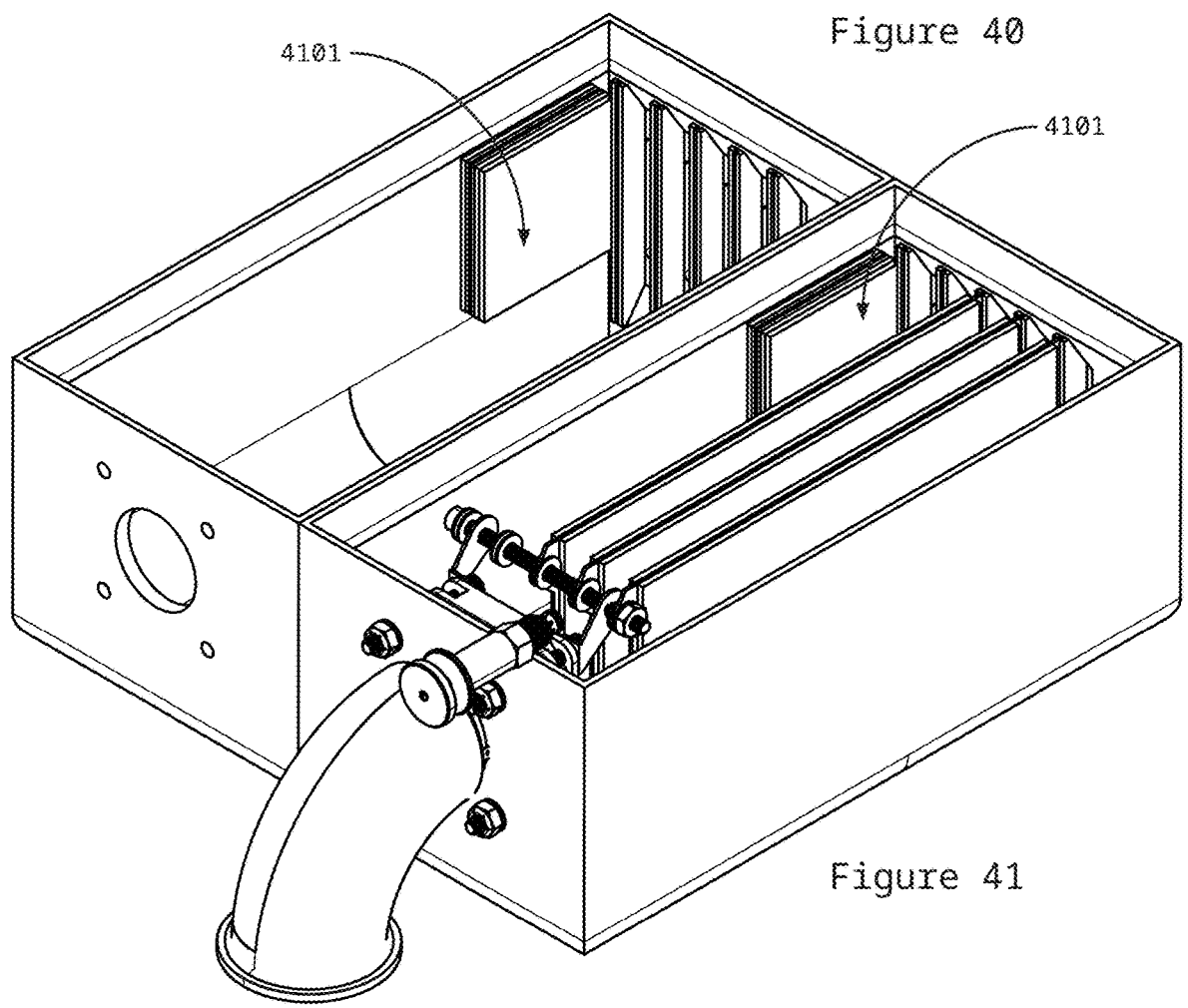
FIG. 41 is a top, front, left view of two AWGs operating in a system.

Furthermore, when operating in tandem, two apparatuses could share a chamber wall, where one surface is hot and the other is cool. This could be accomplished using a thermoelectric device and/or hydronics (liquid heating and cooling). FIGS. 40 and 41 show one embodiment of a system with two apparatuses. The thermoelectric devices 4001, 4101 are placed on common walls, increasing overall efficiency of resources.

In a system configuration, an individual apparatus could be replaced while the others maintain operation.

Dual Chamber Embodiment

Figure 42:
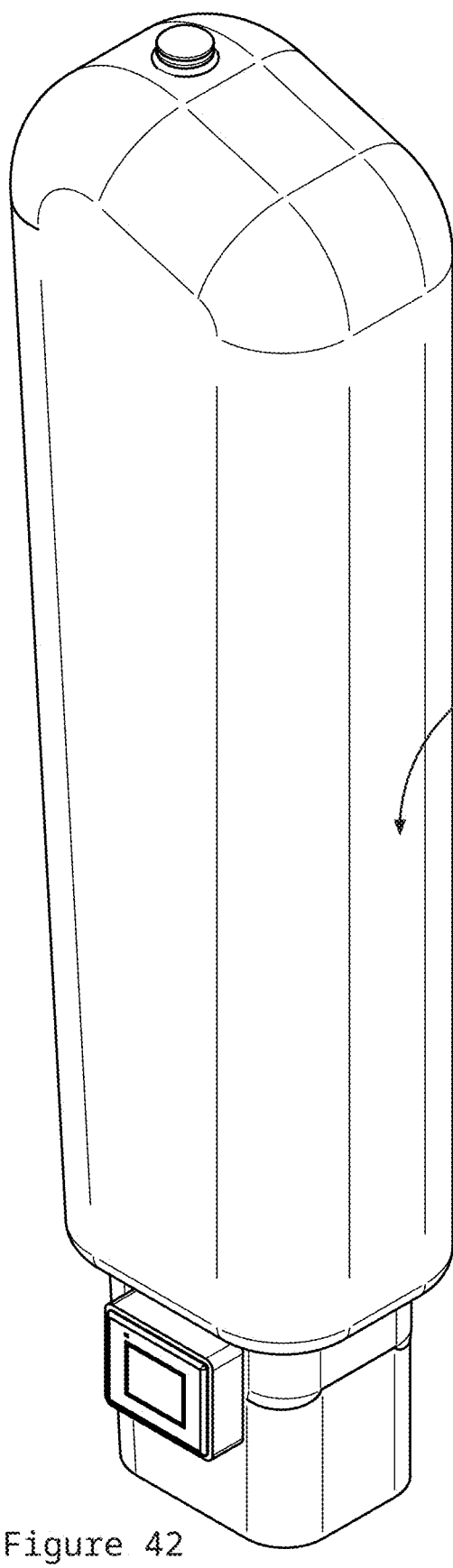
FIG. 42 shows a perspective view of a dual chamber embodiment with an insulation cover.
Figure 43:
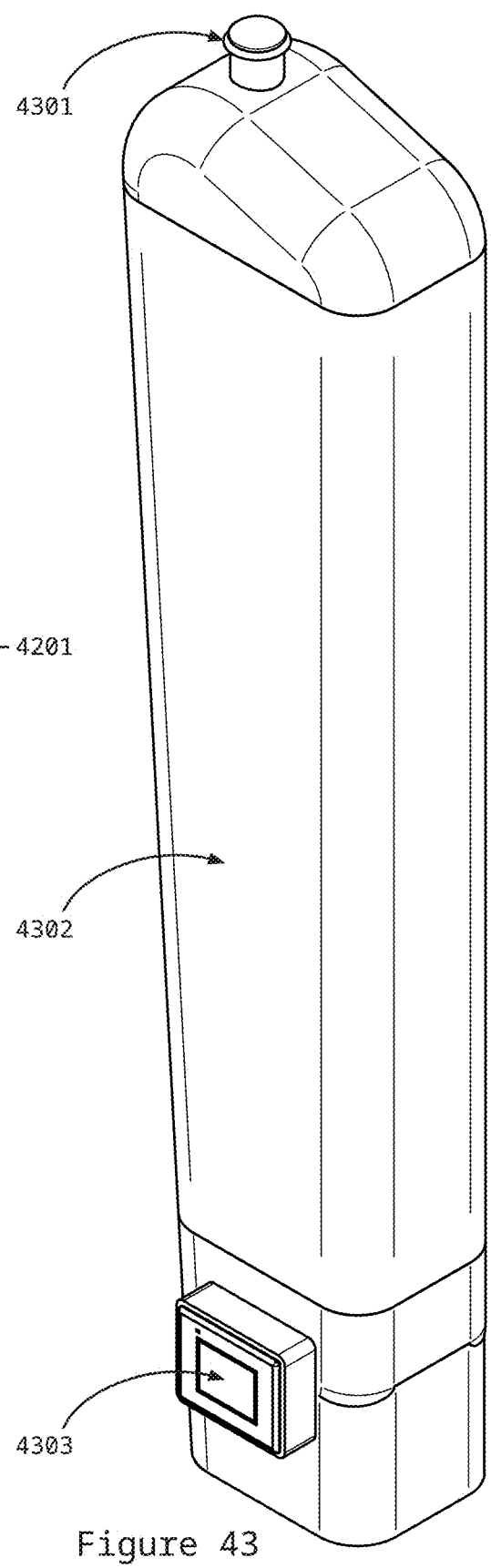
FIG. 43 shows a perspective view of a dual chamber embodiment without an insulation cover.

FIG. 42 shows one embodiment of an apparatus, that utilizes dual chambers for air flow. An insulation cover 4201 over the container aids temperature control. FIG. 43 shows the dual chamber embodiment with the insulation cover removed. An exhaust vent 4301 is positioned at the top of the chamber 4302. A display/control panel 4303 is shown at the bottom of the apparatus.

FIG. 44 shows the dual chamber embodiment with the lid 4401 removed. An internal fan 4402 and a cartridge of HCS's 4403 are visible. FIG. 45 shows the ability to remove the body of the container 4501 from the base of the apparatus 4502. The bottom of a cartridge of HCS's 4503 is visible. The ability to remove the lid and body of the container facilitates the replacement of HCS's and other components.

Figure 46:
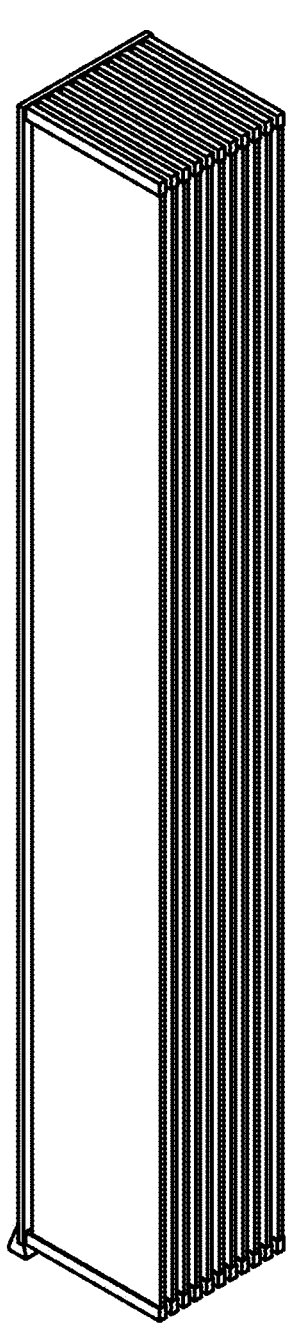
FIG. 46 shows a removable cartridge with twelve hygroscopic polymer sheets.
Figure 47:
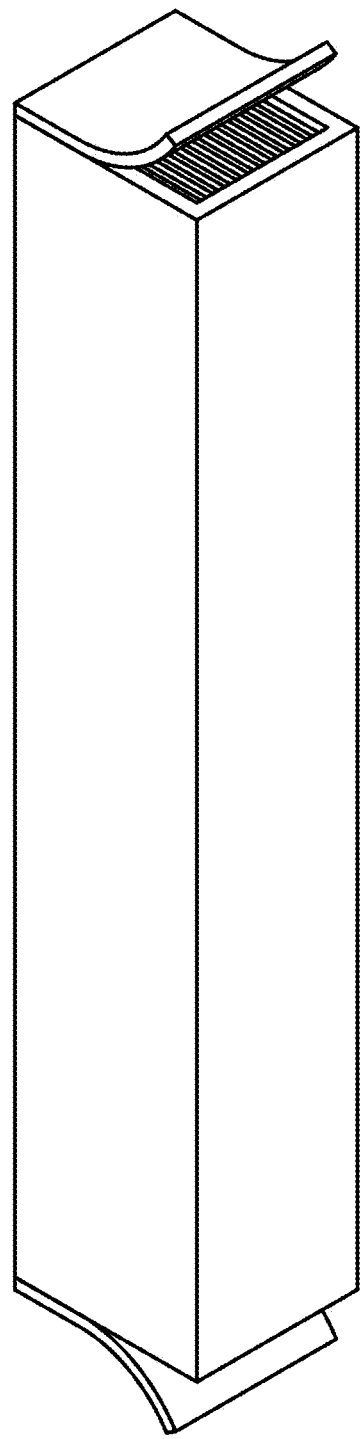
FIG. 47 shows a removable cartridge in packaging.

FIG. 46 shows one embodiment of a removable cartridge. This embodiment shows a cartridge with eleven HCS's. Each HCS is separated by space to permit air flow vertically across the surfaces of the hygroscopic polymer composite. FIG. 47 shows a removable cartridge in packaging material for safe transport.

FIG. 48 shows a side section cut view of the dual chamber embodiment with the insulation cover. The cartridge 4801 is shown on the right chamber, with the section cut running through the HCS showing the internal resistance heating wires. FIG. 49 shows the side section cut view with the insulation cover removed and the side of one HCS 4901. The dual chamber embodiment is designed to utilize convection air flow and water flow.

During the absorption phase, the air intake 4902 and the exhaust vent 4903 are open. Air flows from the bottom up through the right chamber and out through the exhaust vent. Circulation fans 4904 are positioned at the top and bottom facilitate air flow.

Figure 50:
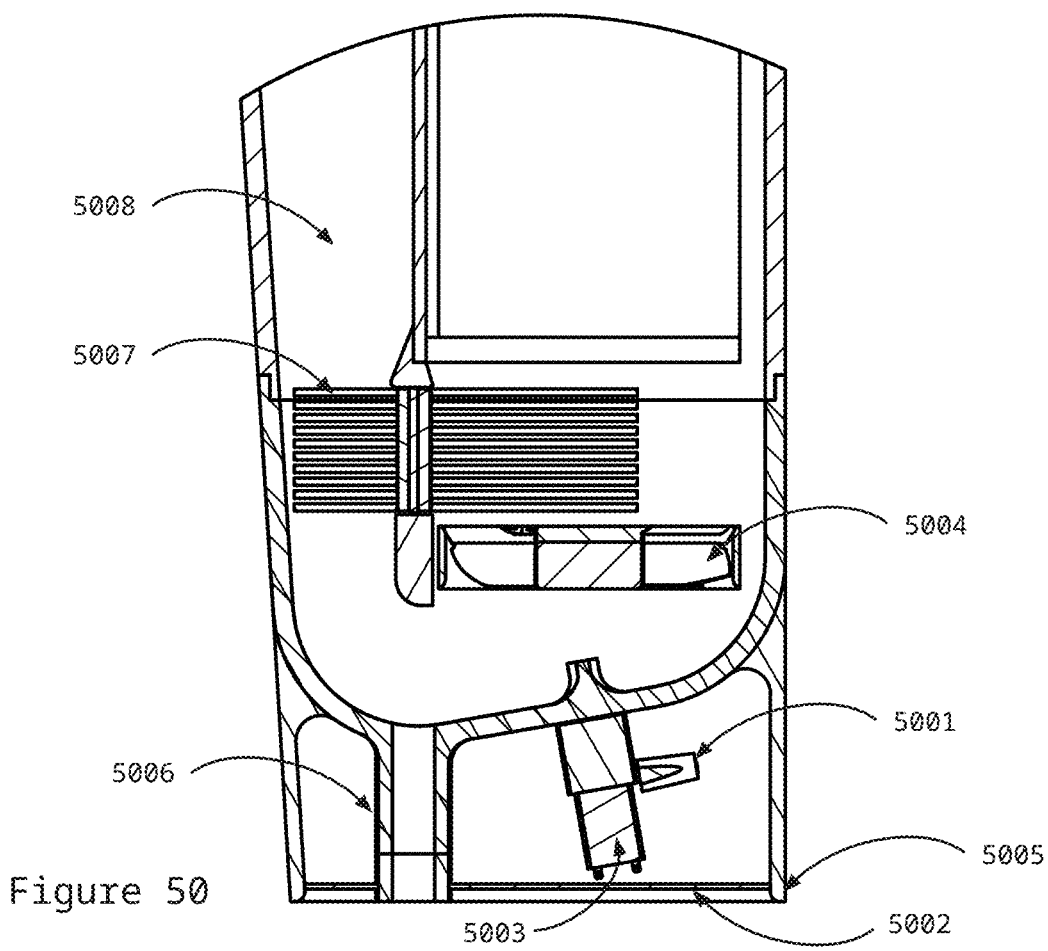
FIG. 50 shows a side section cut detail of the base of the dual chamber embodiment.

FIG. 50 shows a detail of the base of the dual chamber embodiment. In this embodiment, the air intake 5001 is protected by an insect screen 5002, which filters air before entering the chamber. An impeller fan 5003 pulls air in through the air intake. An internal fan 5004 may facilitate air circulation during the absorption phase.

The exterior of the container is further comprised of a drip edge 5005 to prevent rainwater from entering the air intake. A drain 5006 is position at the nadir of curved surfaces to facilitate drainage during the desorption phase.

During the desorption phase, the air intake 5001 is closed. The fan 5004 moves air up through the right chamber up and across the surface area of the HCS's. One embodiment is comprised of a thermoelectric module 5007 that cools the left side and heats the right side. Air flows up through the heated right side of the thermoelectric module and continues up through the right chamber. The air then descends the left chamber 5008. As the air crosses the cool left side of the thermoelectric module it condenses and drips to the bottom of the chamber, and into the drain.

Figure 51:
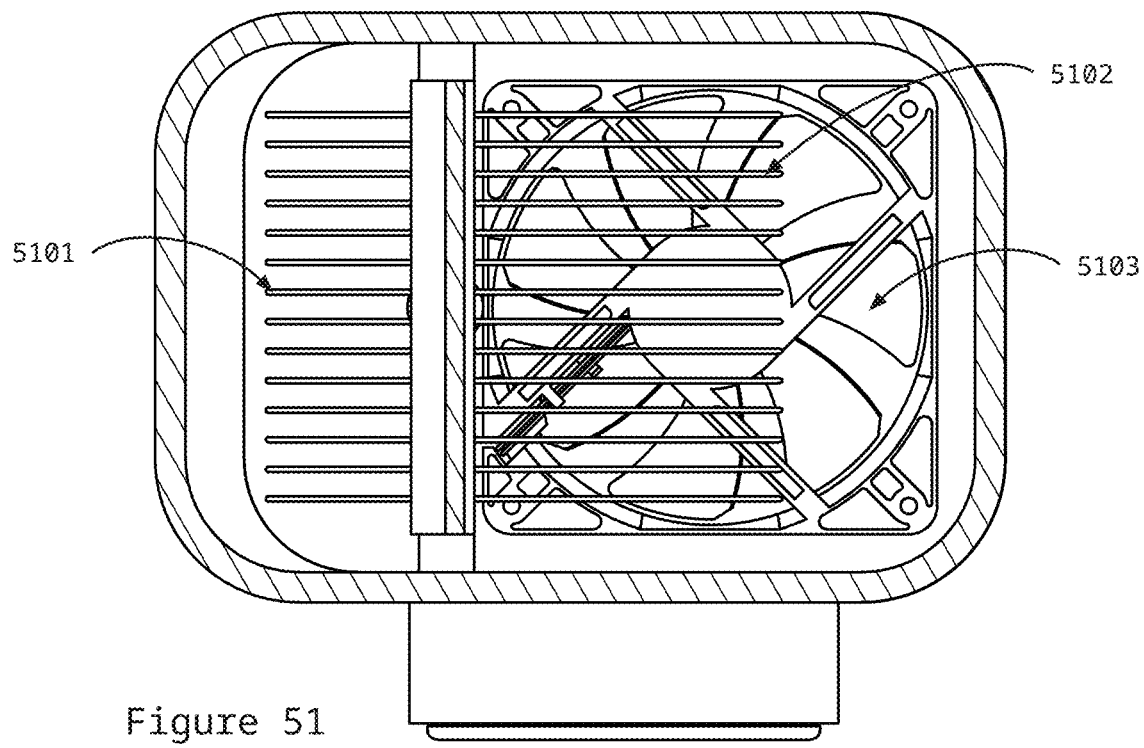
FIG. 51 shows a top section cut view of the base of the dual chamber embodiment.

FIG. 51 shows a top section cut view of the base of the apparatus. The cool side 5101 of the thermoelectric module is in the left chamber, and the heated side 5102 of the thermoelectric module is in the right chamber. The fan 5103 facilitates air flow up through the right chamber.

Figure 52:
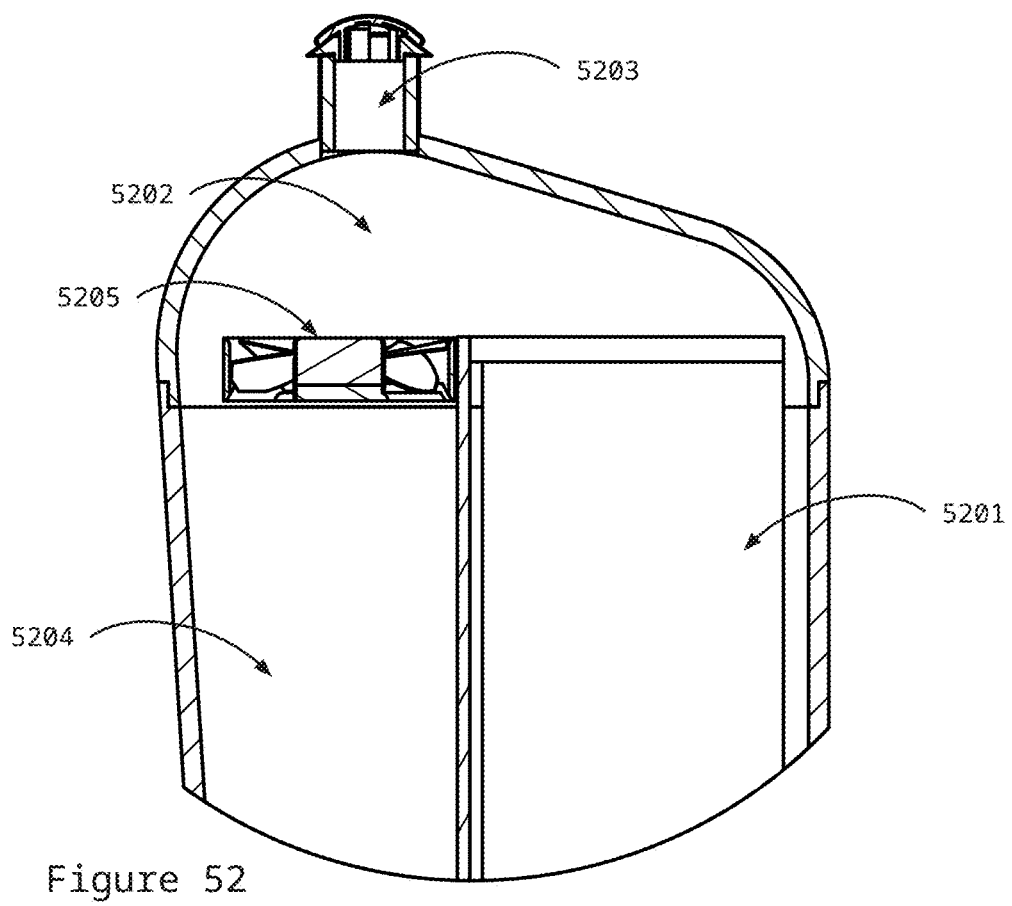
FIG. 52 shows a side section cut detail of the top of the dual chamber embodiment.

FIG. 52 shows a detail of the top of the dual chamber embodiment. During the absorption phase, air flows up the right chamber 5201, through the top chamber 5202, and out the exhaust vent 5203. During the desorption phase, the HCS's expel water vapor which travels up through the right chamber, through the top chamber, and down the left chamber 5204. A circulation fan 5205 and curved surface across the top chamber facilitates air flow.

Figure 53:
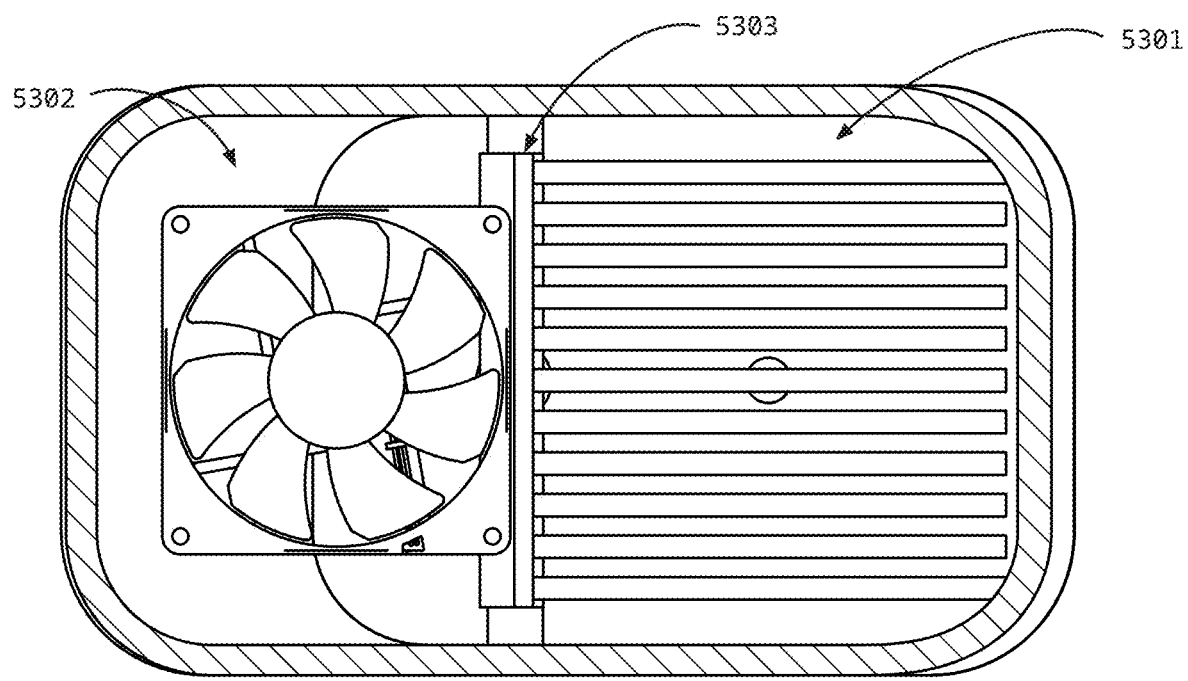
FIG. 53 shows a top section cut view of the top of the dual chamber embodiment.

FIG. 53 shows a top section cut view of the top chamber of the dual chamber embodiment. The HCS's are shown in the right chamber 5301 and a fan is shown in the left chamber 5302. A divider 5303 forms the dual chambers within the container.

Figure 54:
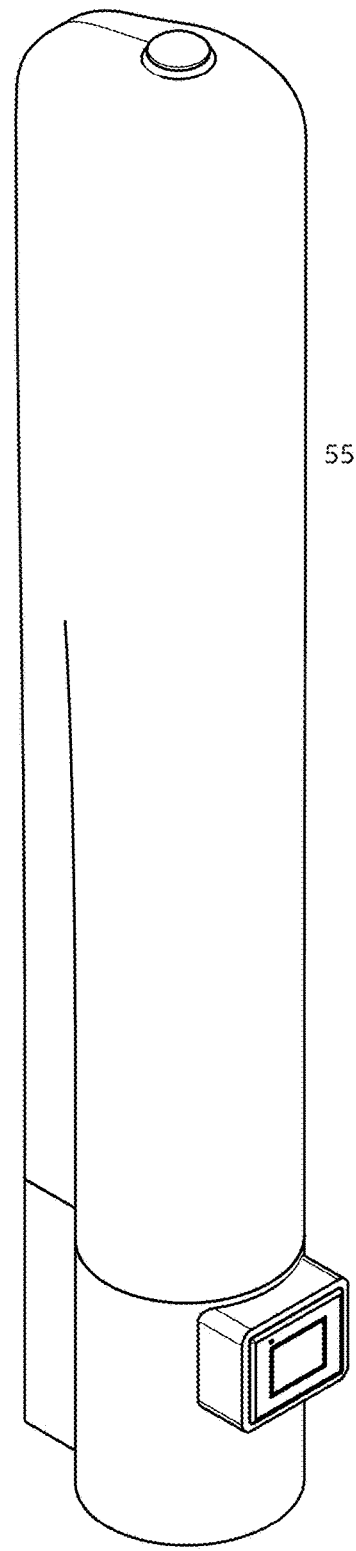
FIG. 54 shows a perspective view of a curved dual chamber embodiment.
Figures 55, 56:
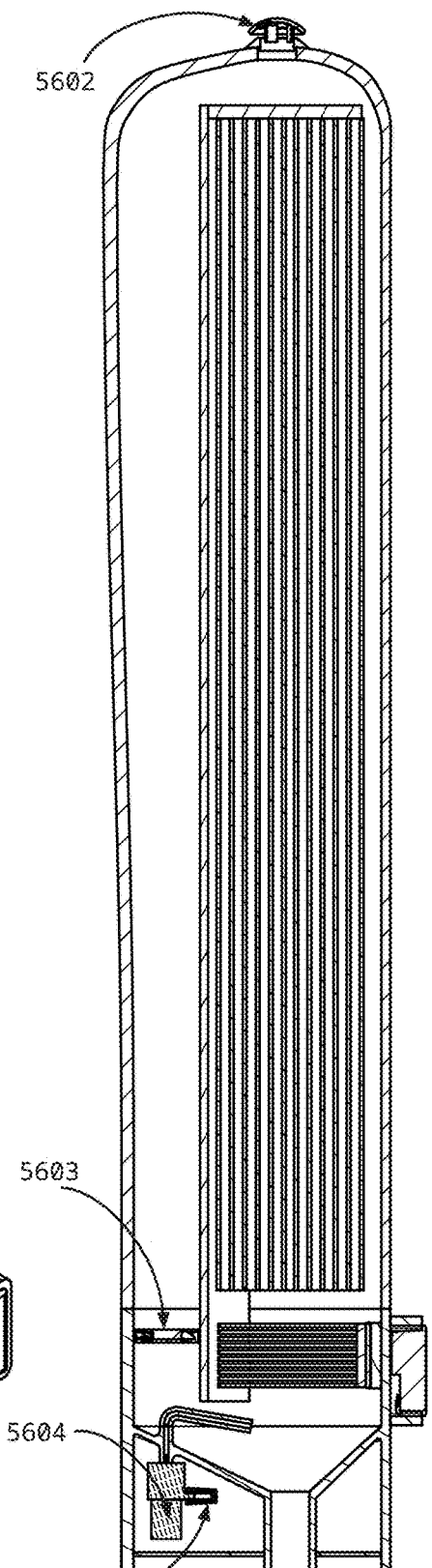
FIG. 55 shows a section cut of the perspective view of the curved dual chamber embodiment.
FIG. 56 shows a section cut side view of the curved dual chamber embodiment during the absorption phase.

FIG. 54 shows a perspective view of an alternative embodiment with dual chambers. This embodiment utilizes a curved container. FIG. 55 shows a section cut of the perspective view. The HCS 5501 is in a spiral format in the right chamber. FIG. 56 shows a section cut side view of the alternative dual chamber embodiment during the absorption phase. The air intake 5601 and exhaust vent 5602 are open. This embodiment has one internal circulation fan 5603 at the bottom of the left chamber, and one impeller fan at the air intake 5604.

Figure 57:
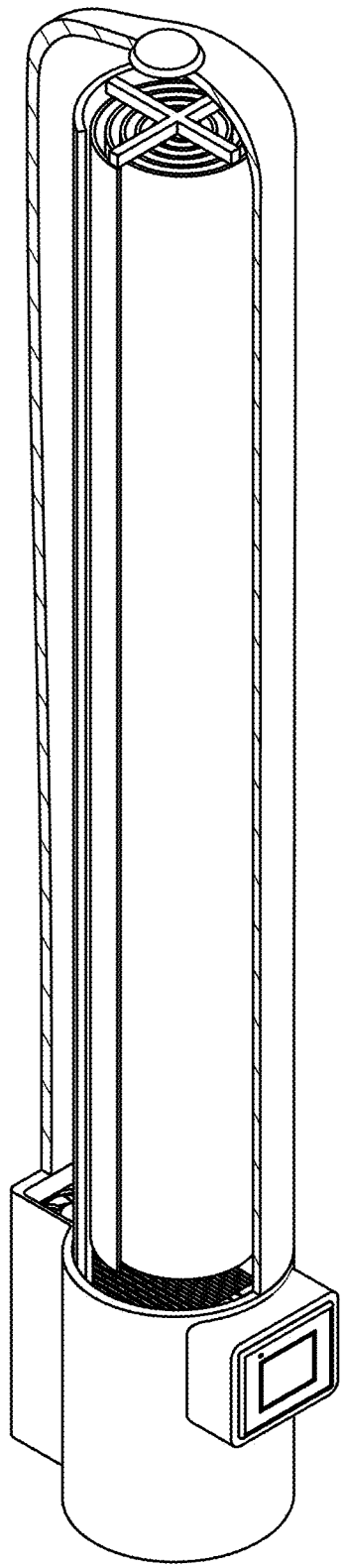
FIG. 57 shows a perspective view of the curved dual chamber embodiment with part of the container removed.
Figure 58:
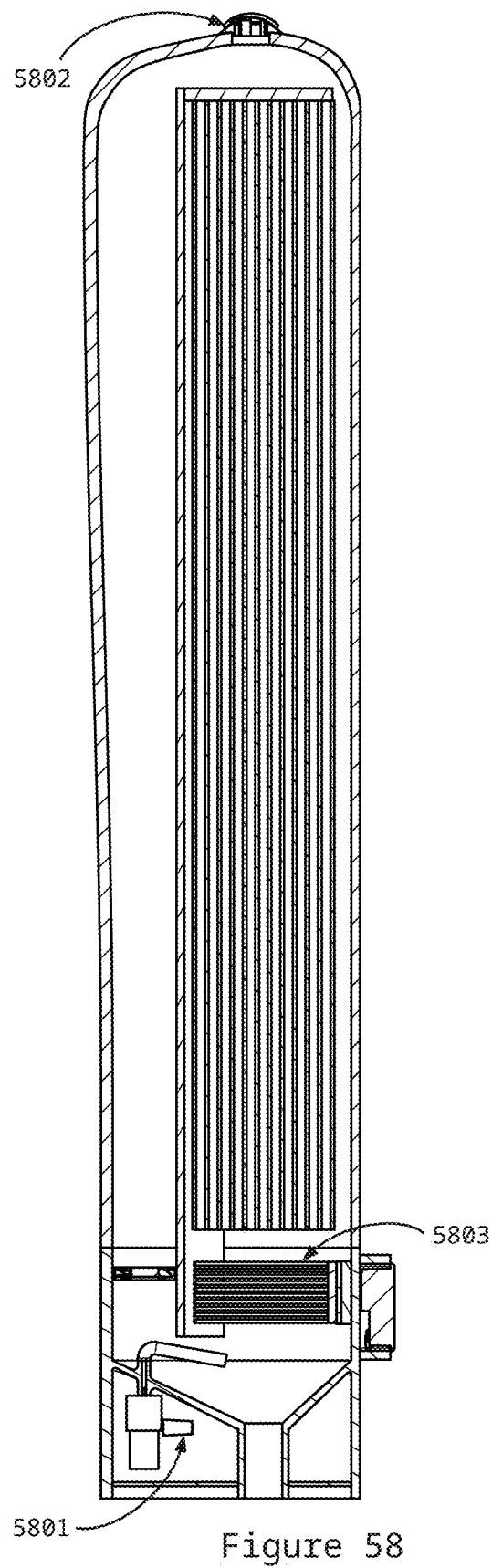
FIG. 58 shows a section cut side view of the curved dual chamber embodiment during the desorption phase.

FIG. 57 shows a perspective view of the alternative dual chamber embodiment with a portion of the container removed. FIG. 58 shows a section cut side view of the embodiment in the desorption phase. The air intake 5801 and exhaust vent 5802 are closed. The thermoelectric module 5803 provides cooling surfaces to facilitate condensation during the desorption phase. The heated side of the module is sunk into the exterior wall or outside of the container.

Geothermal Embodiment

Figures 59, 60, 61, 62:
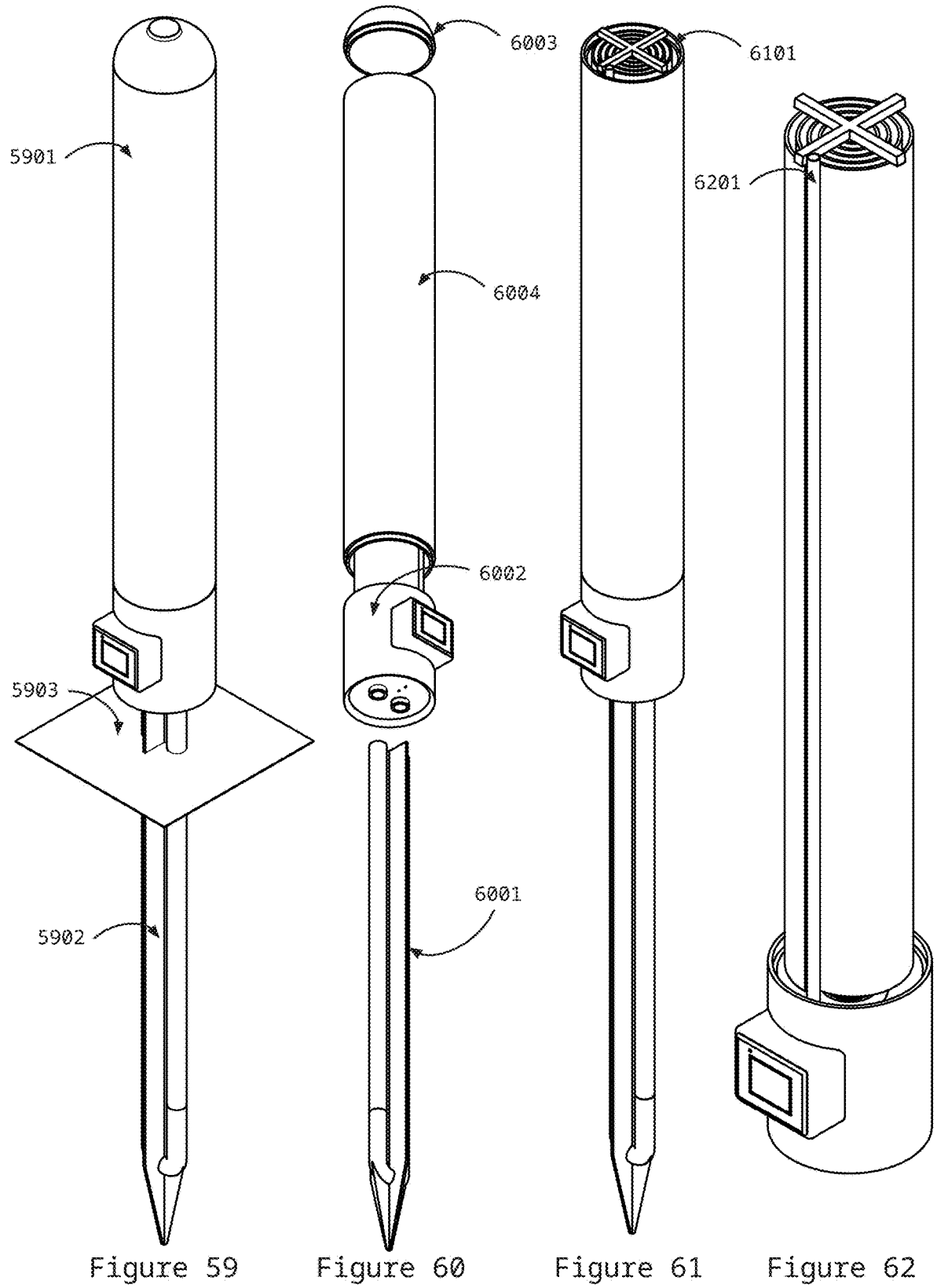
FIG. 59 shows a geothermal embodiment inserted into the ground.
FIG. 60 shows a geothermal embodiment with the stake, exterior, and lid detached.
FIG. 61 shows a geothermal embodiment with the lid removed.
FIG. 62 shows the base and hygroscopic composite sheet of a geothermal embodiment.

FIG. 59 shows an alternative embodiment utilizing geothermal cooling for the desorption phase. This embodiment has a cylindrical container 5901 on a stake 5902 that is inserted into the ground 5903. As the stake is cooled underground, it serves as a condensation surface. The stake may also serve as a drainage directly into the ground through perforations, or to a reservoir.

FIG. 60 shows the geothermal embodiment with the stake 6001 detached from the base 6002. The container lid 6003 and container exterior 6004 are also detached. FIG. 61 shows the geothermal embodiment with the lid removed. A spiral HCS 6101 is inside the chamber. FIG. 62 shows the geothermal embodiment with the container exterior removed. An air tube 6201 travels along the side of the HCS, delivering air from the stake to the top of the chamber.

Figures 63, 64, 65, 66:
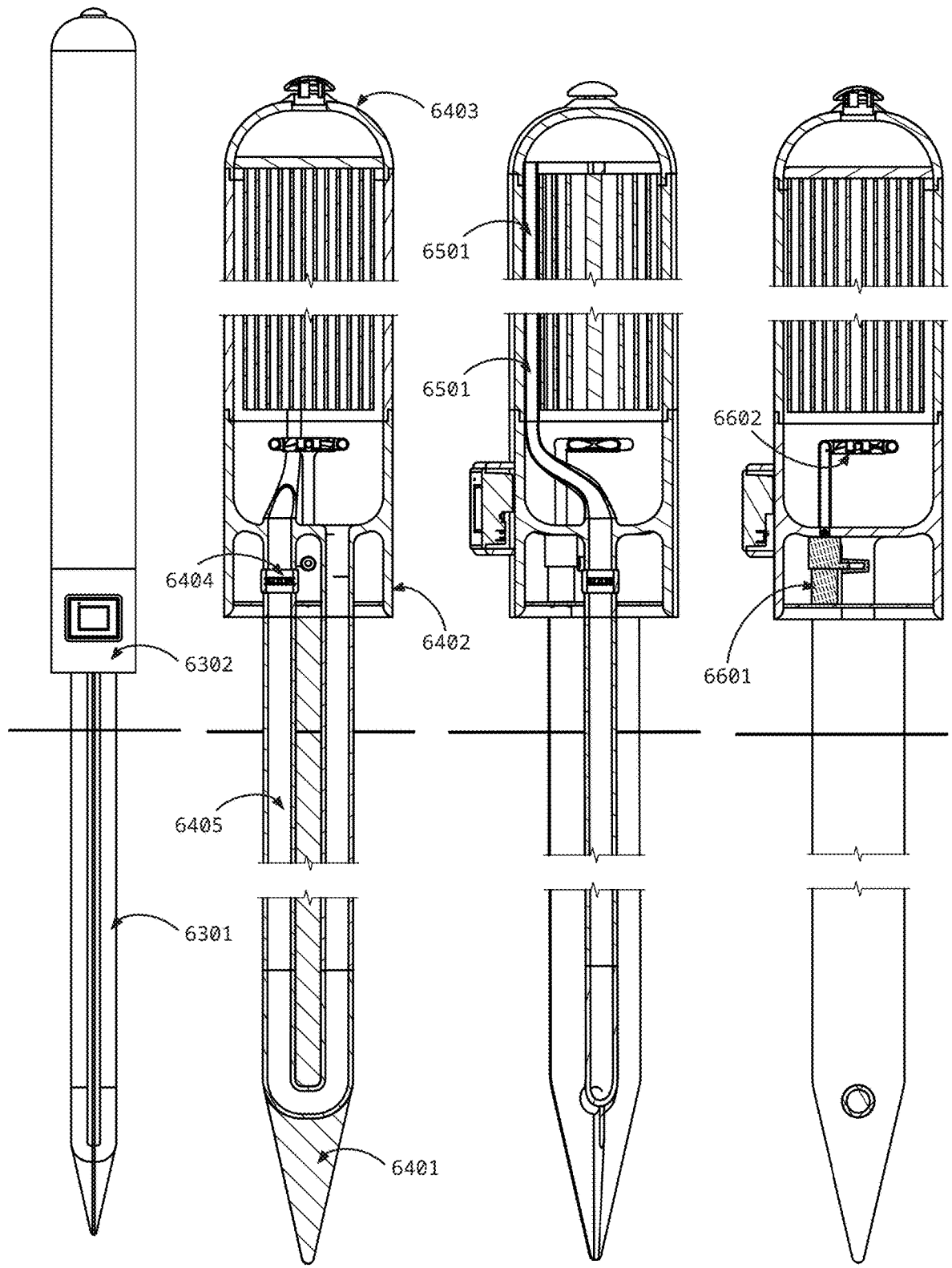
FIG. 63 shows a front view of a geothermal embodiment inserted into the ground.
FIG. 64 shows a first front sectional view of a geothermal embodiment inserted into the ground.
FIG. 65 shows a first side sectional view of a geothermal embodiment inserted into the ground.
FIG. 66 shows a second side sectional view of a geothermal embodiment inserted into the ground.

FIG. 63 shows a front view of the geothermal embodiment. A subterranean tube 6301 runs down from the base 6302 to the bottom of the stake, then back up through the air tube 6201 to the top of the chamber. FIG. 64 shows sectional details of the stake 6401, base 6402, and top 6403 of the geothermal embodiment. During the desorption phase, a circulation fan 6404 moves air through the subterranean tube 6405, and up to the top of the chamber. The naturally cool earth creates a condensation surface along the sides of the subterranean tube. Some embodiments are comprised of a porous subterranean tube for direct drainage of condensed water.

FIG. 65 shows a side view of FIG. 64. The air tube 6501 runs up the side of the container to the top, ensuring air flow from top to bottom during the desorption phase, moving water vapor down into the subterranean tube. FIG. 66 shows a deeper section cut of FIG. 65. An impeller fan 6601 draws air into the chamber during the absorption phase, through an air intake manifold 6602.

Figure 67:
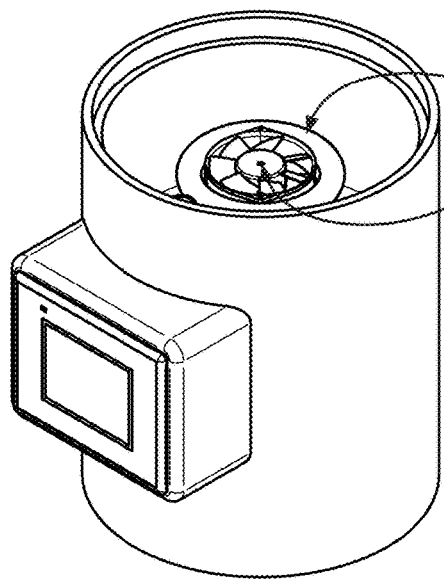
FIG. 67 shows the base of a geothermal embodiment.
Figure 68:
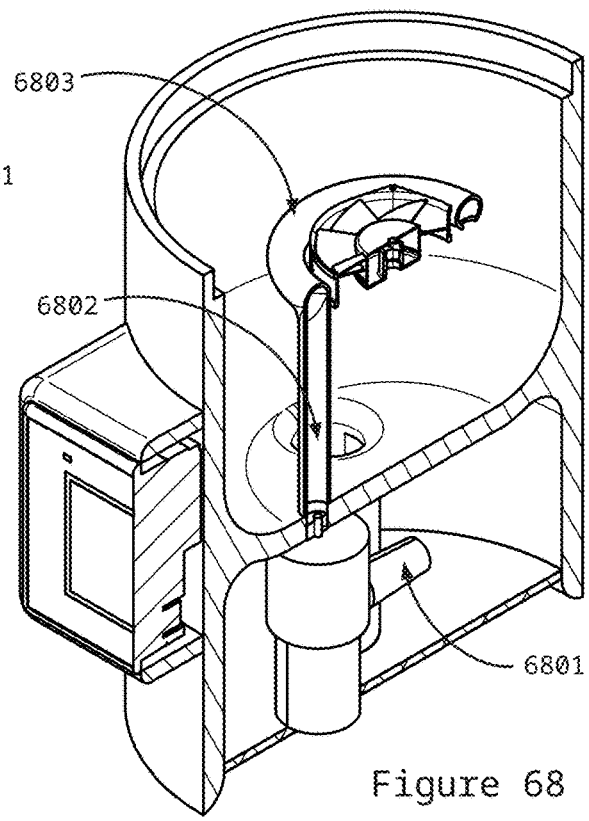
FIG. 68 shows a section cut of the base of a geothermal embodiment.

FIG. 67 shows the base of the geothermal embodiment, with the top of the air intake manifold 6701 showing, and an internal circulation fan 6702 embedded within. FIG. 68 shows a section cut of the base. During the absorption phase, the air intake 6801 brings air up through a small tube 6802 to an air intake manifold 6803.

Figure 69:
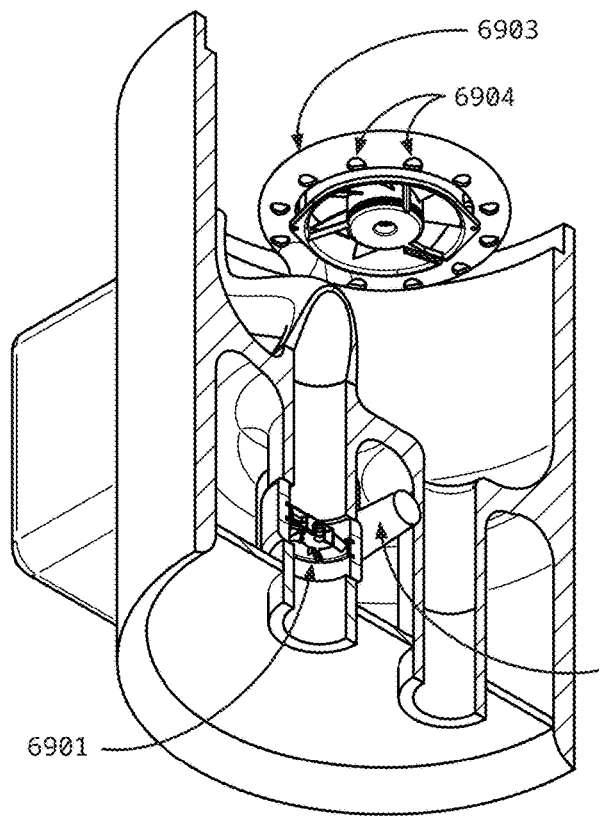
FIG. 69 shows a rear underside view section cut of the base of a geothermal embodiment.
Figure 70:
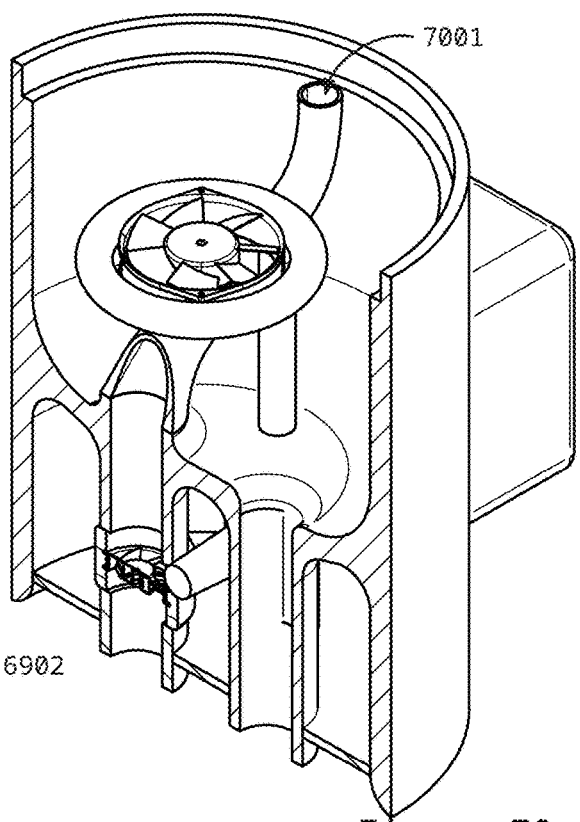
FIG. 70 shows a rear top view section cut of the base of a geothermal embodiment.

FIG. 69 is an underside section cut view of the base. The subterranean tube is section cut. During the desorption phase, a circulation fan 6901 pulls air from the subterranean tube into the air tube running up to the top of the chamber. During the absorption phase, the air intake 6902 draws in outside air, and pushes it through the air intake manifold 6903, where it enters the chamber. Holes 6904 on the underside of the air intake manifold limit moisture entering the air intake manifold. FIG. 70 shows a reverse top section cut perspective view of FIG. 69. The air tube 7001 running up from the subterranean tube to the top of the chamber is clearly visible.

CONCLUSION

While there have been shown and described illustrative examples of a hygroscopic AWG, it is to be understood that various other adaptations and modifications may be made within the spirit and scope of the embodiments herein. Thus, while the foregoing description has been directed to specific embodiments, it will be apparent that other variations and modifications may be made to the described embodiments, with the attainment of some or all their advantages. Accordingly, this description is to be taken only by way of example and not to otherwise limit the scope of the embodiments herein.

The invention claimed is:
1. An apparatus for harvesting water from the air, comprising:

a container with at least one chamber configured to be open or closed, at least two surfaces of interpenetrating polymer network composite comprised of at least one hydrophilic polymer and one thermo-responsive polymer inside the at least one chamber, said at least two surfaces separated by spacer media configured to permit air flow across the surfaces, and a means for heating the interpenetrating polymer network composite, wherein:
the interpenetrating polymer network composite absorbs water vapor from the air when the at least one chamber is open, and the interpenetrating polymer network composite desorbs water vapor into the at least one chamber when the interpenetrating polymer network composite is heated and the at least one chamber is closed.

2. The apparatus of claim 1, wherein said at least two surfaces are oriented vertically.

3. The apparatus of claim 1, wherein said at least two surfaces are two sides of a plane rolled into a spiral.

4. The apparatus of claim 1, wherein said at least two surfaces are independent parallel planes.

5. The apparatus of claim 1, wherein said spacer media is further comprised of said means for heating the interpenetrating polymer network composite.

6. An apparatus for harvesting water from the air, comprising:

a container with at least one chamber configured to be open or closed, an interpenetrating polymer network composite comprised of at least one hydrophilic polymer and one thermo-responsive polymer inside the at least one chamber, said interpenetrating polymer network mechanically attached to protrusions on a reinforcement material, and a means for heating the interpenetrating polymer network composite, wherein:
the interpenetrating polymer network composite absorbs water vapor from the air when the at least one chamber is open, and the interpenetrating polymer network composite desorbs water vapor into the at least one chamber when the interpenetrating polymer network composite is heated and the at least one chamber is closed.

7. The apparatus of claim 6, wherein said interpenetrating polymer network composite is cast to at least one side of said reinforcement material.

* * * * *